United States Patent
Toguchi et al.

[11] Patent Number: 6,104,878
[45] Date of Patent: Aug. 15, 2000

[54] FAILURE DETECTION APPARATUS FOR STORING AND DISPLAYING THE NATURE OF THE FAILURE AND THE TIME OF ITS OCCURRENCE

[75] Inventors: Michi Toguchi, Higashiyamato; Osamu Nonaka; Atsushi Maruyama, both of Sagamihara, all of Japan

[73] Assignee: Olympus Optical Co., Ltd., Tokyo

[21] Appl. No.: 08/746,273

[22] Filed: Nov. 7, 1996

[30] Foreign Application Priority Data

Nov. 9, 1995 [JP] Japan ..................................... 7-291343
May 28, 1996 [JP] Japan ..................................... 8-133777

[51] Int. Cl.$^7$ .............................. G03B 17/00; G03B 7/02
[52] U.S. Cl. ........................... 396/52; 396/281; 396/288; 396/310
[58] Field of Search .................................... 396/281, 284, 396/285, 287–292, 429, 52, 53, 55, 104, 310

[56] References Cited

U.S. PATENT DOCUMENTS 5,282,127  1/1994  Mii ........................................... 364/130
5,296,884  3/1994  Honda et al. ............................ 396/311
5,666,186  9/1997  Meyerhoefer et al. .................. 396/281

FOREIGN PATENT DOCUMENTS 47-31614    11/1972  Japan .
5-150314    6/1993   Japan .
6-175175    6/1994   Japan .
6-194727    7/1994   Japan .
7-26837     5/1995   Japan .
7-209727    8/1995   Japan .

Primary Examiner—David M. Gray
Attorney, Agent, or Firm—Louis Weinstein

[57] ABSTRACT

A failure detection and storage device provided with a failure factor detection unit for detecting generation of a failure factor when the failure factor being capable of causing a failure of a camera is generated, a date-and-time information output unit for outputting date-and-time information which corresponds to a date and a time at which the failure factor is generated, a storage unit being capable of storing failure factor information representing the failure factor, the generation of which is detected by the failure factor detection unit, and date-and-time information outputted the date-and-time information output unit, a display unit being capable of displaying the information stored by the storage unit and a control unit for determining a level of the failure factor, the generation of which is detected by the failure factor detection unit, and for deciding whether or not at least one of the failure factor information, the generation of which is detected by the failure factor detection unit, and the date-and-time information, which is outputted by the date-and-time output unit, is stored by the storage unit.

11 Claims, 20 Drawing Sheets

| NO. | CONTENT |
|-----|---------|
| 21  | ZOOM    |
| 22  | POWER SUPPLY |
| 23  | WINDER  |

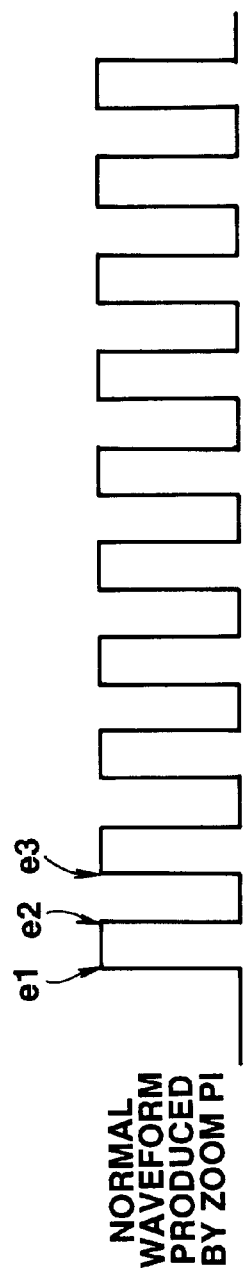
FIG. 22 NORMAL WAVEFORM PRODUCED BY ZOOM PI
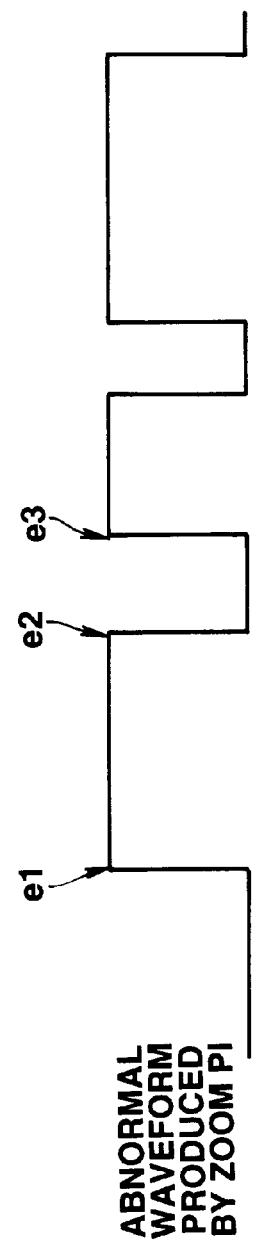
FIG. 23 ABNORMAL WAVEFORM PRODUCED BY ZOOM PI

FAILURE DETECTION APPARATUS FOR STORING AND DISPLAYING THE NATURE OF THE FAILURE AND THE TIME OF ITS OCCURRENCE

BACKGROUND OF THE INVENTION

1. Field of the Invention

The present invention generally relates to a failure detection and storage apparatus and more particularly to a failure detection and storage apparatus having an impact detection function to be applied to the recognition of a failure of a camera.

2. Description of the Related Art

A precision device, for example, a camera is sometimes broken by being dropped or hit against something during the handling thereof. This may occur without being noticed by a user. Even if the user notices, it is difficult for the user to determine how a failure (or fault) of the camera occurs. If the user can localize a broken part of the camera, the user further can prepare and use an alternative one. It is, however, difficult for the user to accurately know the particular failure conditions of the camera. Further, inconveniently, after taking a picture, it is difficult to determine whether it is the failure or fault of the camera itself or an erroneous operation thereof which is the cause of the poor picture quality.

Even in the case that the camera appears to operate normally when actually manipulated, a part thereof such as a lens, from the appearance of which the trouble cannot be well checked, may break down. If the user takes a picture without identifying the broken-down part thereof, a poor-quality picture is produced.

In view of such circumstances, in the Japanese Unexamined Patent Publication No. 7-209727, the applicant of the present application has proposed technical means for alerting a user to the fact that an impact is made on the camera. Namely, this technical means is adapted to detect an impact made on the main body of the camera by placing members, in which breakage or cracks occur when receiving an impact, at the corners thereof.

Although the technical means proposed in this Japanese Unexamined Patent Publication No. 7-209727 is very useful, it is difficult to determine the time at which the failure occurs in the camera.

Meanwhile, previously, the following camera has been disclosed in, for instance, the Japanese Unexamined Patent Publication No. 6-194727. Namely, this camera is adapted to perform operations, such as (1) the opening of a power supply switch, (2) the closing of a lens barrier, (3) the collapsing of a lens barrel, (4) the locking of a back cover, (5) the rewinding of film and (6) the storing of the number of frames, upon making an impact on the main body thereof, so that each of the parts thereof is prevented from being damaged.

Further, there has been known another camera of such a type that is further provided with a recovery switch and has a self-checking function of moving a movable part thereof only when this switch is operated. By the self-checking, this camera can know whether or not the destruction of a component, which results in a failure of the camera, occurs. Consequently, a user of this camera can be prevented from wastefully continuing to perform operations for taking pictures.

However, in the case of such a camera, as a result of performing a manual operation of the recovery switch, it takes much time to perform a sequence of checking operations from the opening/closing of a shutter to the rewinding of film. Moreover, if the opening of the shutter is performed when the film is loaded into the camera, (one frame of) the film is exposed to light. At that time, if (this frame of) the film has not been exposed yet, only this single frame is wasted. In contrast, if this frame has already been used for taking a picture, there may be caused a trouble that the picture taken in this frame is erased or wasted.

To obviate such a trouble, in the case of using the conventional camera, the exposure of the film to light is prevented by first performing the rewinding of the film after the detection of an impact, and further performing the opening/closing the shutter upon completion of the rewinding of the film. However, even when performing this method, if an impact is detected at a moment corresponding to a frame which is close to the last frame of the film, it takes much time to rewind the part, which has already been advanced theretofore, of the film. Moreover, after it is determined at the time of driving the shutter that there is no abnormality, it similarly takes much time to advance the film again to a frame on which a picture is taken.

As above described, the conventional camera has a drawback in that when using the conventional camera, it takes too much time to perform a self-checking operation after an impact is detected.

Meanwhile, the Japanese Unexamined Patent Publication No. 6-175185 discloses the related art for storing the maximum value of detected impacts, for displaying the stored maximum impact value and for warning a user.

Further, the Japanese Unexamined Patent Publication No. 5-175185 discloses the related art for photographing and storing the driving state of a vehicle at all times by using an on-vehicle camera and for stopping the vehicle when the acceleration thereof exceeds a predetermined value.

Moreover, the Japanese Unexamined Patent Publication No. 47-31614 discloses the related art for automatically photographing the state of a vehicle by using an on-vehicle camera at a moment when the front portion of the vehicle collides with something.

Furthermore, in the Japanese Unexamined Utility Model Publication No. 7-26837, there has been proposed the related art for absorbing an impact made on the main body of camera by placing elastic members at the corners thereof.

SUMMARY OF THE INVENTION

It is a first object of the present invention to provide a failure detection and storage device which can asseses the situation of a device accurately and speedily when a failure thereof occurs.

It is a second object of the present invention to provide an impact detection camera having an impact detection function, by which mechanical, optical and electrical minimum mechanism check including sure abnormality-detection and mechanism-initialization can be made only on operations of principal parts of a camera, namely, a lens-barrel, lenses and a clutch mechanism when there is a fear of a failure of the camera owing to an impact or the like.

Briefly, a failure detection and storage device of the present invention comprises:

failure factor detection means for detecting generation of a failure factor when the failure factor being capable of causing a failure of a camera is generated;

date-and-time information output means for outputting date-and-time information which corresponds to a date and a time at which the failure factor is generated;

storage mans being capable of storing failure factor information representing the failure factor, the generation of which is detected by the failure factor detection means, and date-and-time information outputted by the date-and-time information output means;

display means being capable of displaying the information stored by the storage means; and control means for determining a level of the failure factor, the generation of which is detected by the failure factor detection means, and for deciding whether or not at least one of the failure factor information, the generation of which is detected by the failure factor detection means, and the associated date-and-time information, which is outputted by the date-and-time output means, is stored by the storage means.

Other features, objects and advantages of the present invention will become apparent from the following description of preferred embodiments.

BRIEF DESCRIPTION OF THE DRAWINGS

FIG. 22 is a graph for illustrating the waveform of a normal output signal of a zoom PI of the sixth embodiment of the present invention when driving the lens-barrel thereof;

FIG. 23 is a graph for illustrating the waveform of an abnormal output signal of a zoom PI of the sixth embodiment of the present invention when driving the lens-barrel thereof;

DESCRIPTION OF THE PREFERRED EMBODIMENTS

Hereinafter, the preferred embodiments of the present invention will be described in detail by referring to the accompanying drawings.

Figure 1:
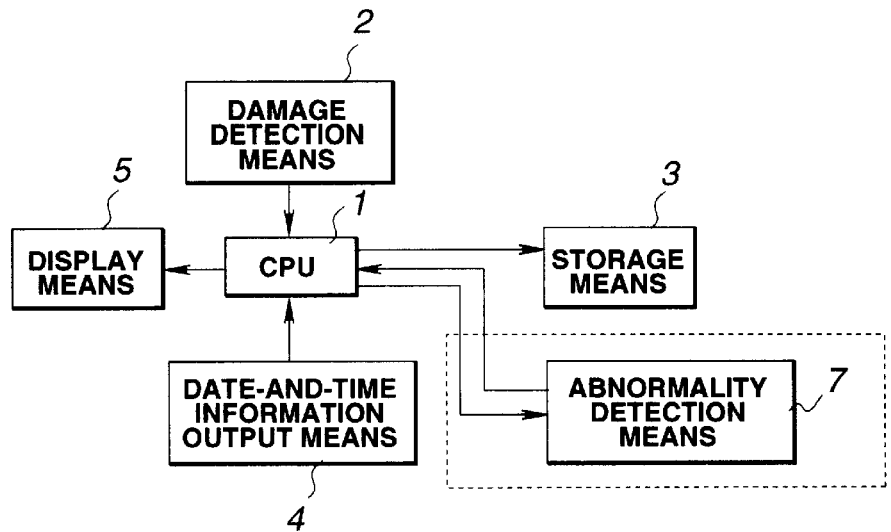
FIG. 1 is a block diagram for illustrating the basic configuration of a failure detection and storage device embodying the present invention, namely, a first embodiment of the present invention.

FIG. 1 is a block diagram for illustrating the basic configuration of a failure detection and storage device embodying the present invention, namely, a first embodiment of the present invention.

As shown in this figure, the failure detection and storage device has a primary portion which consists of: a damage detection means 2 which is adapted so that when a damage, which is a predetermined failure factor, is caused to an apparatus provided with this failure detection and storage device from the exterior thereof, the damage detection means 2 detects such a fact and outputs damage detection information indicating the detection of the damage; a date-and-time information output means 4 for outputting information concerning a date and a time at which the cause of the damage is detected; a storage means 3 that can store the date-and-time information, information representing a part to which the damage is caused, information representing the damage; a display means 5 for displaying the contents of, namely, the information stored in this storage means 3; an arithmetic and control means (namely, a central processing unit (CPU)) 1 for inputting information from the damage detection means 2, for controlling a sequence of operations, for storing the detection information in the storage means 3 and for causing the display means 5 to store the information; and an abnormality detection means 7 for checking according to the detection information outputted by the damage detection means 2 whether or not an abnormality occurs in each of the parts of the apparatus provided with the failure detection and storage device.

Incidentally, an impact made on the apparatus, or a change in environment of the apparatus, for example, a change in temperature thereof is considered as a damage which is a failure factor.

Figure 2:
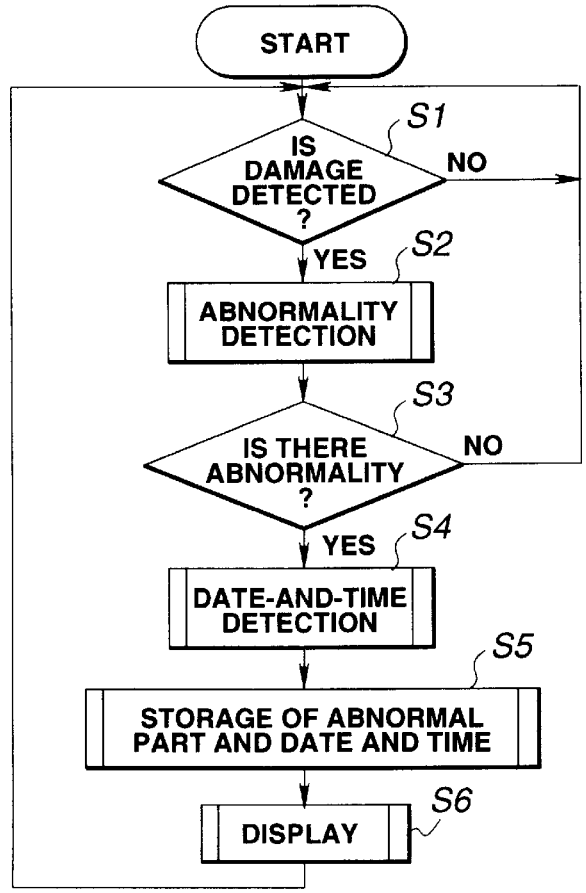
FIG. 2 is a flowchart for illustrating an operation of the failure detection and storage device embodying the present invention, namely, the first embodiment of the present invention.

Next, an operation of this embodiment having such a configuration will be described hereinbelow with reference to a flowchart of a program of FIG. 2.

First, when it is detected by the damage detection means 2 (in step S1) that a predetermined force (namely, a damage) is applied to the apparatus provided with the failure detection and storage device, the damage detection information is transmitted from the damage detection means 2 to the arithmetic and control means (CPU) 1. Incidentally, the impact made on the apparatus, or the change in environment of the apparatus is considered as the damage which is a failure factor.

When the damage detection information is inputted from the damage detection means 2, the CPU 1 executes a subroutine for detecting an abnormality (in step S2). Namely, the CPU 1 controls and causes the abnormality detection means 7 to start checking whether or not an abnormality occurs in each of the parts of the apparatus. Thus, the CPU 1 detects an abnormality therein (in step S3). Hereat, if no abnormality is detected, it is judged that there is no influence of the damage. Then, the program returns to step S1 whereupon an operation of detecting a damage is performed.

If an abnormality is detected in step S3, the CPU 1 receives the date-and-time information from the date-and-time information output means 4 (in step S4). Further, the CPU 1 causes the storage means 3 to store information representing a part of the apparatus, at which an abnormality is detected by the abnormality detection means 7, and the date-and-time information outputted by the date-and-time information output means 4 therein (in step S5). Incidentally, the date-and-time information is not limited to information representing the date and time but includes all necessary information representing a year, a month, a date, an hour and a second. Thereby, a user can take a necessary step by checking an indication displayed on the screen of the display means 5.

Additionally, in the case that a one-chip microcomputer is utilized as the arithmetic and control means 1, the arithmetic and control means 1 may further have the function of the abnormality detection means 7 because of the abundance of the functions of the one-chip microcomputer.

Thus, in the case of this failure detection and storage device (namely, this embodiment), the sense of relief at the time of using the apparatus provided with the device, as well as the reliability of the device at such a time, can be enhanced by detecting and storing an impact, which is made on a part whose failure is hard to detect, and a parameter which is a failure factor such as an ambient temperature of the apparatus.

Next, a second embodiment of the present invention, in which the basic configuration of the aforementioned failure detection and storage device (namely, the first embodiment) is applied to a camera, will be described hereinafter.

Figure 3A:
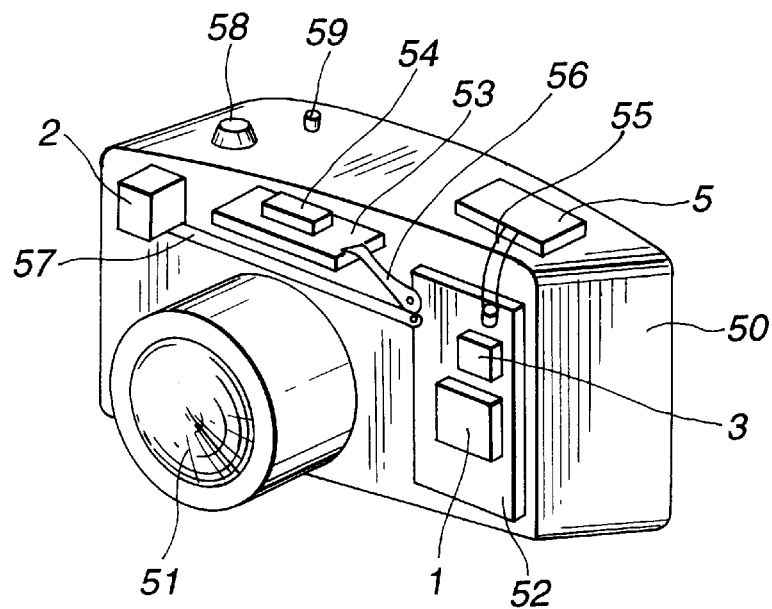
FIG. 3A is a perspective diagram for illustrating the configuration of a primary part of another failure detection and storage device embodying the present invention, namely, a second embodiment of the present invention.
Figure 3B:
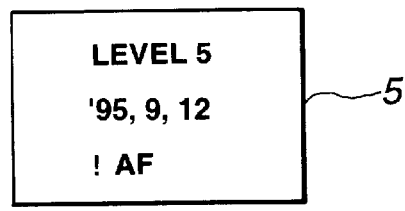
FIG. 3B is a front view of an example of the failure detection and storage display device, namely, the second embodiment of the present invention.
Figure 4:
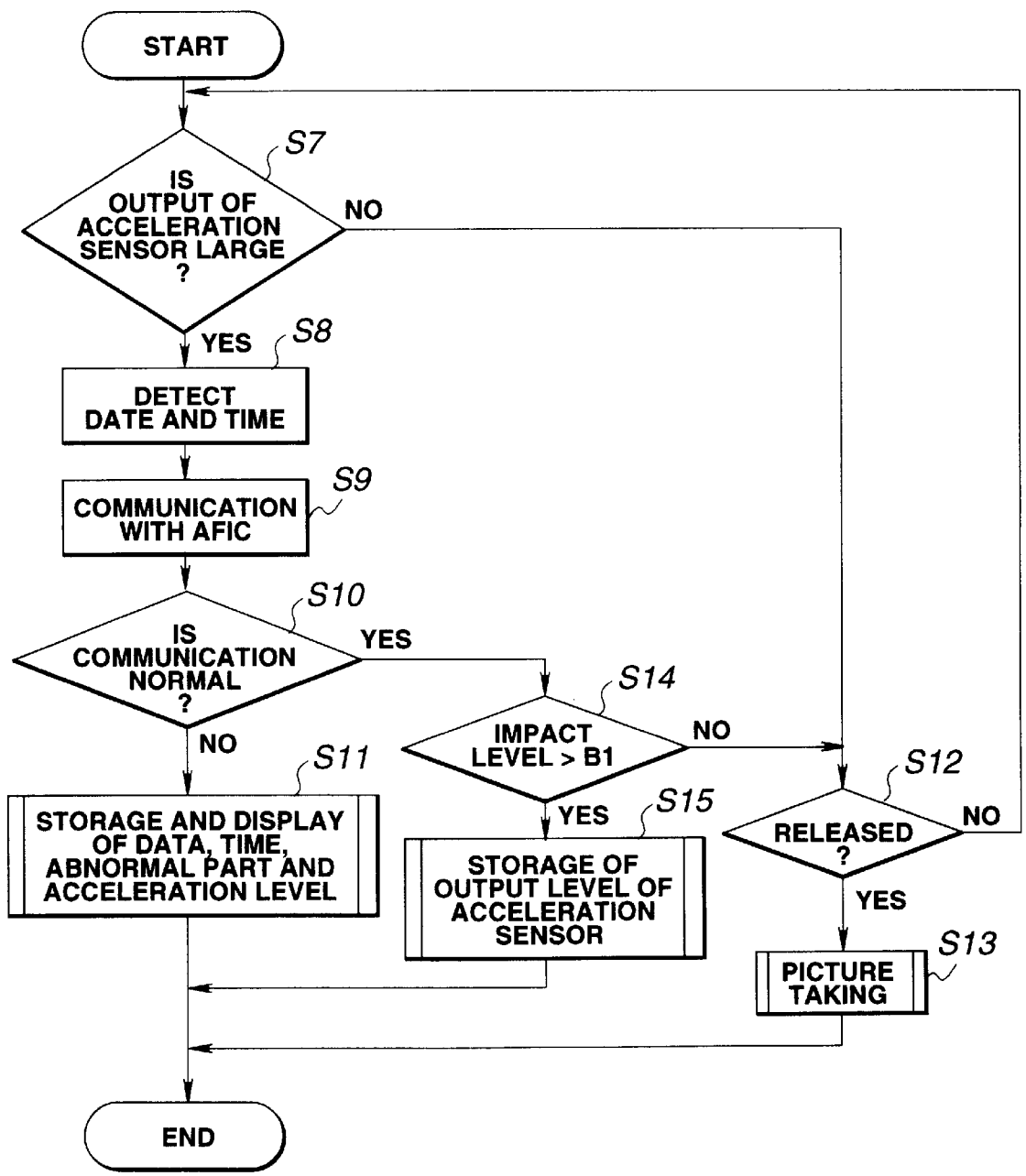
FIG. 4 is a flowchart for illustrating an operation of a camera provided with the failure detection and storage device, namely, the second embodiment of the present invention.

FIG. 3A is a perspective diagram for illustrating the configuration of a primary part of another failure detection and storage device embodying the present invention, namely, a second embodiment of the present invention. FIG. 3B is a front view of an example of this failure detection and storage device. FIG. 4 is a flowchart for illustrating an operation of a camera provided with this failure detection and storage device.

As above stated, this second embodiment is an example of an embodiment in which the failure detection and storage device of the present invention is applied to a camera. FIG. 3A illustrates how an electrical circuit is mounted in the camera.

As shown in these figures, the camera equipped with this failure detection and storage device has a main body 50, on a side portion and the top portion of which component mounting boards 52 and 53 are mounted. The arithmetic and control means (CPU) 1, an electrically writable memory which is the storage means 3, and so on are mounted on the board 52. Further, an automatic focusing IC (AFIC) 54 is mounted on the board 53. An output of this AFIC is connected to the board 52 through a flexible printed circuit board 56.

Moreover, a liquid crystal display portion acting as the display means 5 is placed on the top surface of the main body 50 of the camera. Thereby, a photographer obtains information concerning time, at which a picture is taken, and knows the corresponding date and time.

This liquid crystal display portion 5 is connected to the board 52 through the flexible printed circuit board 55.

On the other hand, an acceleration sensor serving as the damage detection means 2 is placed on the other side of the main body of the camera. This acceleration sensor 2 is used to detect a hand shake of the camera. Further, an output of this acceleration sensor 2 is connected to the board 52 through the flexible printed circuit board 57.

Incidentally, in this figure, reference numeral 51 designates a picture-taking lens of the camera; and 58 a shutter button.

When a predetermined impact is made on the camera equipped with the failure detection and storage device of this embodiment having such a configuration, a load is imposed on a connector portion of the flexible printed circuit board 56 when the camera shakes. This results in occurrences of the troubles that a communication failure between the AFIC 54 and the CPU 1 is caused and that the correct focusing cannot be achieved.

Next, an operation of the failure detection and storage device, which is used to detect the occurrences of such troubles, of this embodiment will be briefly described hereunder by referring to a flowchart of a program of FIG. 4.

The CPU 1 monitors the output level of a signal outputted by the acceleration sensor 2 at all times. When the acceleration sensor 2 detects a camera shake and this output level is higher than a predetermined value (in step S7), the date and time are first detected (in step S8). Subsequently, it is checked (in steps S9 and S10) whether or not an abnormality occurs in the communication between the AFIC 54 and the CPU 1. Hereat, if it is judged that a communication abnormality occurs, the CPU 1 causes the storage means 3 to store the date and time, the abnormal part, the acceleration level and so forth at the time when an impact is made on the camera. Further, the CPU 1 causes the liquid crystal display portion 5 (in step S11) to indicate the fact that the impact is made on the camera. For example, FIG. 3B illustrates an example in which an impact having an acceleration level of 5 is made on the main body of the camera on Sep. 12, 1995 and an abnormality occurs in an automatic focusing (AF) portion.

Although a failure in photographing is prevented even when performing such a communication checking, a user cannot know when and how the communication failure is caused. Thus, a user is liable to have a feeling of uneasiness. In accordance with this embodiment, it is displayed when and how a failure (or fault) occurs. Consequently, there can be provided a camera which causes the user to feels the sense of relief. If a part, at which a failure occurs, of the camera is displayed, the effect can be further enhanced.

Meanwhile, it is difficult to electrically determine whether mechanical parts such as the picture-taking lens 51 are normal or abnormal. In the case of this embodiment, when the level of an impact made on the main body of the camera is higher than a predetermined level B1 even if it is judged in step S10 the communication condition is normal, the CPU 1 causes the storage means 3 (in step S15) to store the output level of the acceleration sensor 2 in view of the possibility that the picture-taking lens 51 is damaged. Incidentally, in such a case, a failure does not always occur, so that the indication of the failure is not displayed and that only when a specific switch 59 (see FIG. 3A) provided in the camera is operated, a predetermined indication is displayed on the screen of the liquid crystal display portion 5. Incidentally, the predetermined level B1 used in step S14 as a criterion for the impact level is preliminarily stored in, for instance, the storage means 3.

If it is determined (in step S7) that no impact is made on the main body of the camera, or if it is judged (in step S14) that the impact level is less than the predetermined level B1, a sequence of picture-taking operations are performed (in step S13) in response to the operation of the release button (in step S12).

Thus, in the case of this embodiment, the fear of an occurrence of a failure in a part, which is hard to check electrically, is predicted by using the acceleration sensor.

Further, in the case of this embodiment, when a failure (or fault) occurs, the cause of the failure can be easily determined. Consequently, the quick repair of the camera can be achieved.

As an application of this embodiment, the shock sensor may be placed on each part of the camera, so that a further specific part can be determined by detecting what sensor responds, and then recording the detected sensor. Naturally, the failure detection and storage device of this embodiment can be applied to portable products or goods.

Next, a third embodiment of the present invention will be described hereinbelow.

Figure 5:
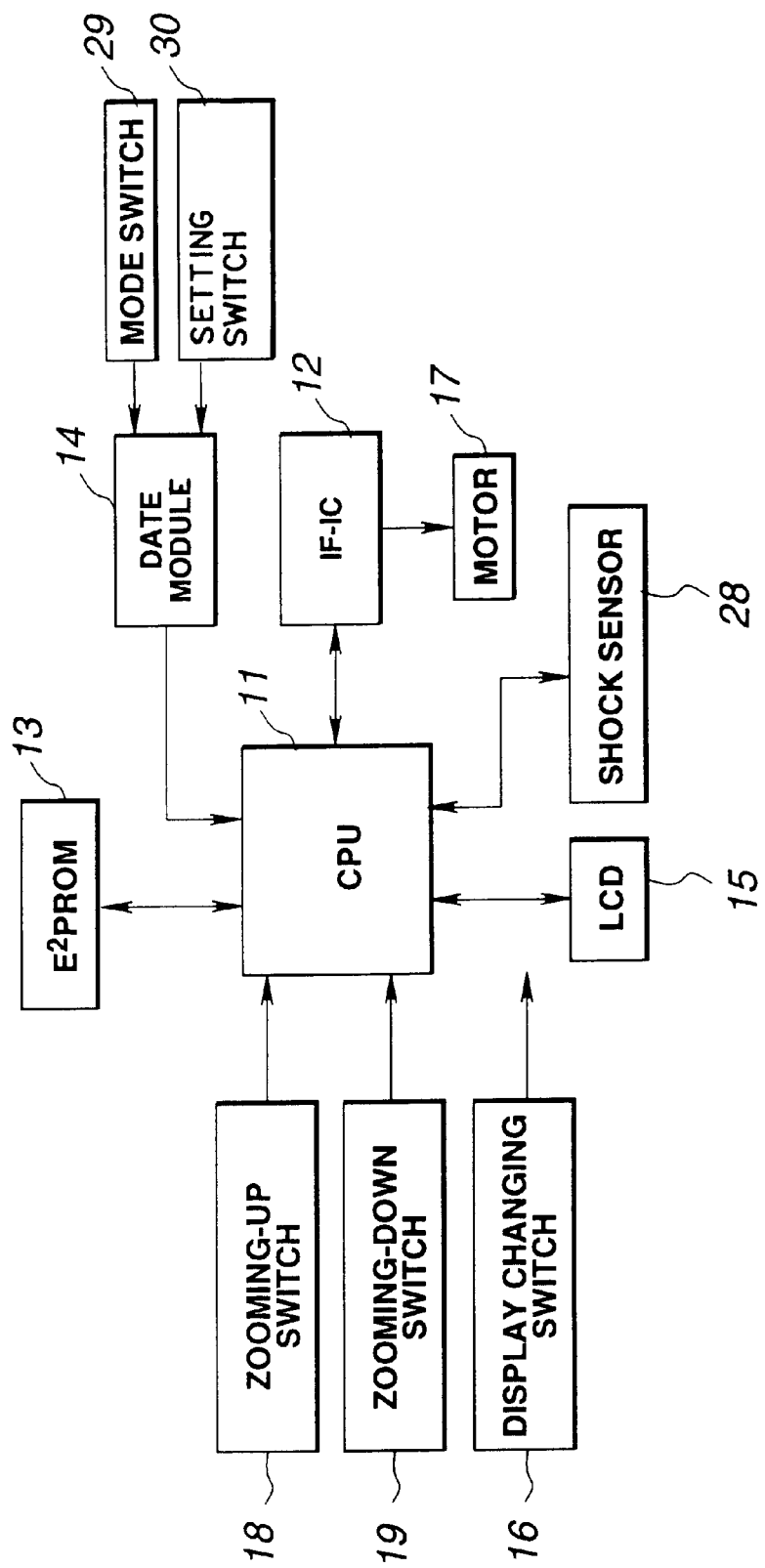
FIG. 5 is a block diagram for illustrating the configuration of a primary part of a camera provided with still another failure detection and storage device embodying the present invention, namely, a third embodiment of the present invention.

FIG. 5 is a block diagram for illustrating the configuration of a primary part of a camera provided with still another failure detection and storage device embodying the present invention, namely, the third embodiment of the present invention.

First, the composing elements of the camera, namely, of this embodiment, which respectively correspond to the damage (or impact) detection means, the date-and-time information output means, the storage means, the display means and the arithmetic and control means of the first embodiment, and operations of such composing elements will be described hereinafter.

As shown in FIG. 5, in the case of the camera, namely, this embodiment of the present invention, CPU 11 acting as the arithmetic and control means is a control portion for controlling operations of the entire camera and is connected to IF-IC 12 for driving a lens-frame driving motor 17 (to be described later) through a communication line. Further, an electrically rewritable memory and EEPROM 13 are connected to the CPU 11 and are adapted to store predetermined information under the control of the CPU 11.

Moreover, a date module 14 having a clock or timer function is connected to the CPU 11 and sends the date-and-time information to the CPU 11 at all times. Furthermore, a liquid crystal display portion (LCD) 15 placed on the top surface of the main body of the camera is connected to the CPU 11. In normal times, clock information based on the date-and-time information sent from the date module 14 is displayed on the screen of the LCD 15 under the control of the CPU 11.

Further, a mode switch 29, which is used for setting and changing the format of indication of the date and time, and a setting switch 30, which is used for setting the indication of the modified date and time, are connected to the date module 14. The aforementioned kinds of setting are performed by turning on these switches, respectively. Incidentally, the mode switch 29 and the setting switch 30 are placed on the top surface of the main body of the camera.

Moreover, this embodiment is adapted so that the date and time are displayed on the screen of the LCD 15 by simultaneously pushing the two switches, namely, the mode switch 29 and the setting switch 30. Incidentally, the details of such an operation will be described later.

Meanwhile, one or more shock sensors 28 for detecting impacts made on the main body of the camera are placed at predetermined places on the main body of the camera, and are adapted so that when an impact equal to or greater than a predetermined level is made thereon from the exterior, the corresponding sensor senses the impact and sends an output thereof to the CPU 11.

Hereinafter, the shock sensor 28 will be described in detail by referring to FIG. 6.

Figure 6:
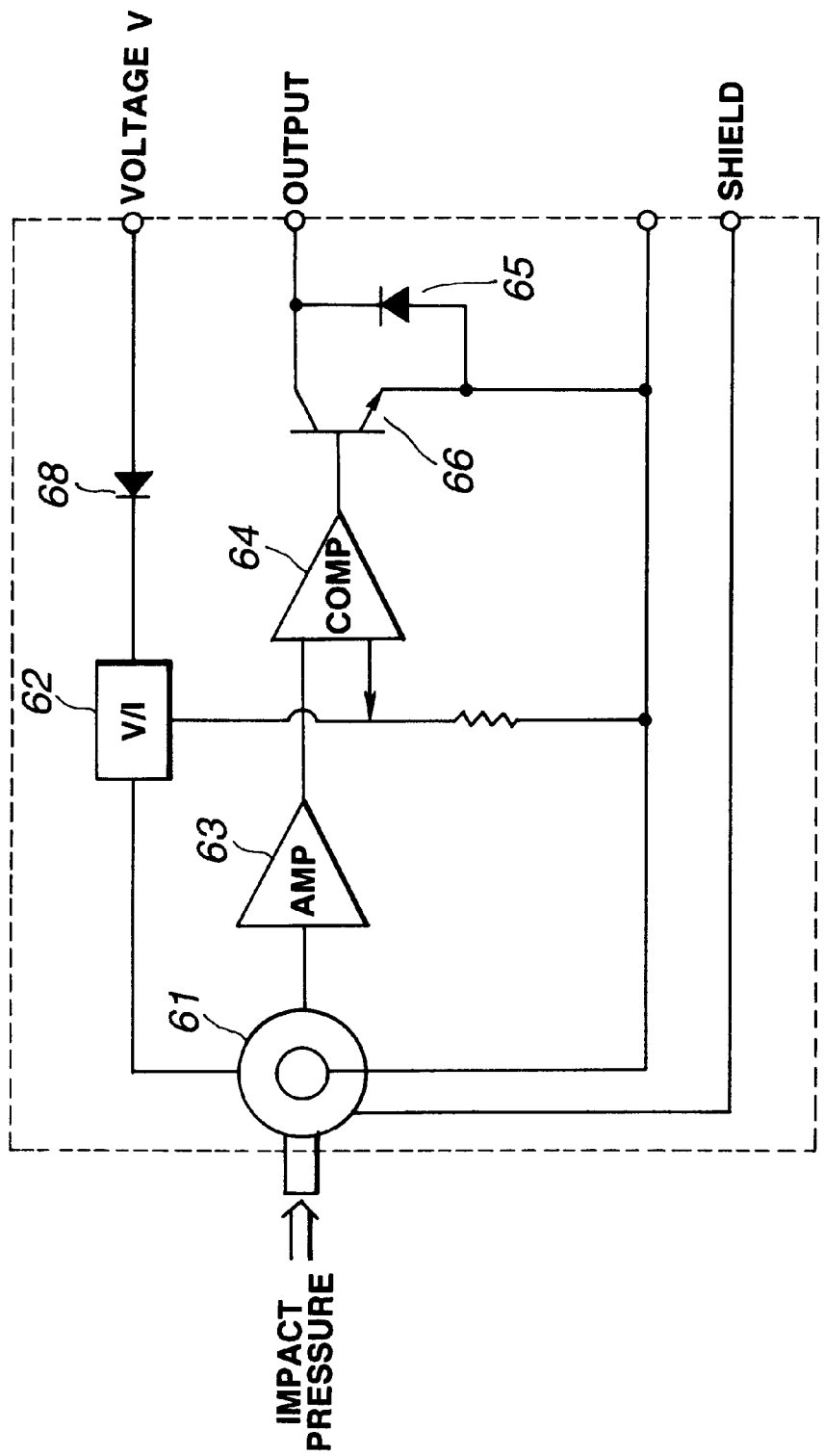
FIG. 6 is an electrical circuit diagram for illustrating the configuration of a shock sensor of a camera provided with the failure detection and storage device, namely, the third embodiment of the present invention.

FIG. 6 is an electrical circuit diagram for illustrating the configuration of the shock sensor 28.

This shock sensor 28 is an electronic switch using a semiconductor. Further, an amplifier circuit, a comparator circuit and so on, which are necessary for processing impact signals, are integrated thereinto. However, the size of the shock sensor 28 is very small. Namely, as shown in this figure, the shock sensor 28 has a primary part consisting of: a semiconductor impact sensor 61; a power supply portion 62; a diode 68, which is used for preventing a backward flow of electric current from the power supply; an amplifier circuit 63, a comparison circuit (namely a comparator) 64; and output circuits 65 and 66.

An output of the impact sensor 61 is inputted to the amplifier circuit 63 whereupon the level of the output of the sensor 61 is amplified to an input level of the comparison circuit 64. In this comparison circuit 64, the input level thereto is compared with a preset impact level. If the input level exceeds the preset impact level, namely, if the level of the detected impact exceeds the preset impact level, the base electrode of the output transistor 66 is set at "H"-level (namely, High level). Incidentally, the output transistor 66 is an open collector output transistor. Further, when the output of amplifier 63 exceeds the preset impact level, the transistor 66 is brought into conduction (namely, into an ON-state). Moreover, at that time, an output signal is outputted from the output terminal thereof to the CPU 11.

Figure 7:
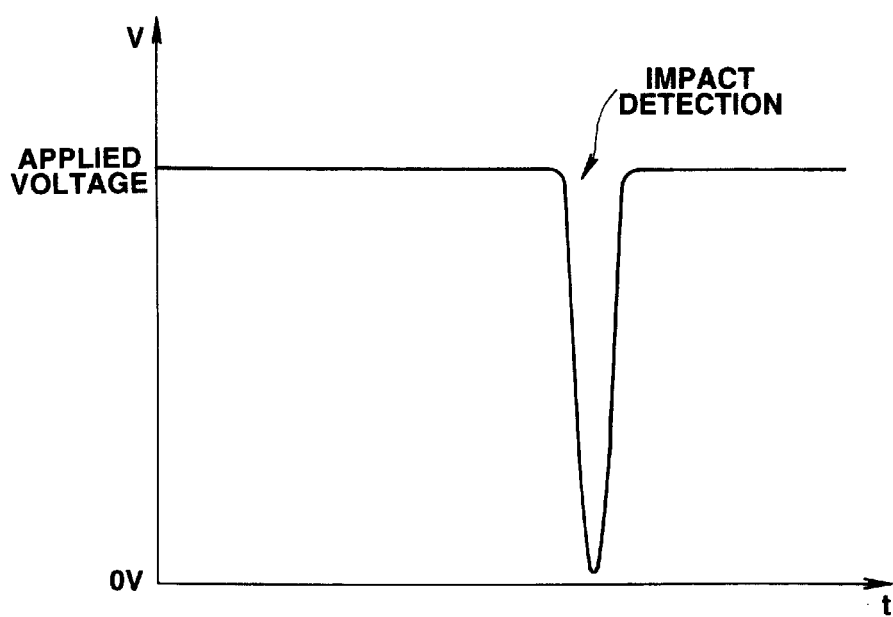
FIG. 7 is a graph for illustrating an example of the waveform of an output signal of the shock sensor at the time of detecting an impact made on the camera which is provided with the failure detection and storage device, namely, the third embodiment of the present invention.

FIG. 7 is a graph for illustrating an example of the waveform of an output signal of the shock sensor 28 at the time of detecting an impact made on the main body of the camera, namely, of this embodiment, which is provided with the failure detection and storage device, namely, the third embodiment of the present invention.

As above described, under normal conditions, the shock sensor 28 outputs from the output terminal thereof the voltage level of a signal, which is applied to the terminal thereof. However, when an impact is made on the main body of the camera at a moment as illustrated in FIG. 7, the level of an output signal of this sensor changes into "L"-level. When CPU 11 detects such a signal having "the L-level", the CPU 11 causes the EEPROM 13 to store information representing the place, at which the sensor having detected the impact is placed, and the date and time at which the impact is detected.

Incidentally, even if the number of the shock sensors 28 is only one, the aforementioned advantages or effects can be obtained. However, the place, on which the impact is made, can be specified more detailedly.

Figure 8:
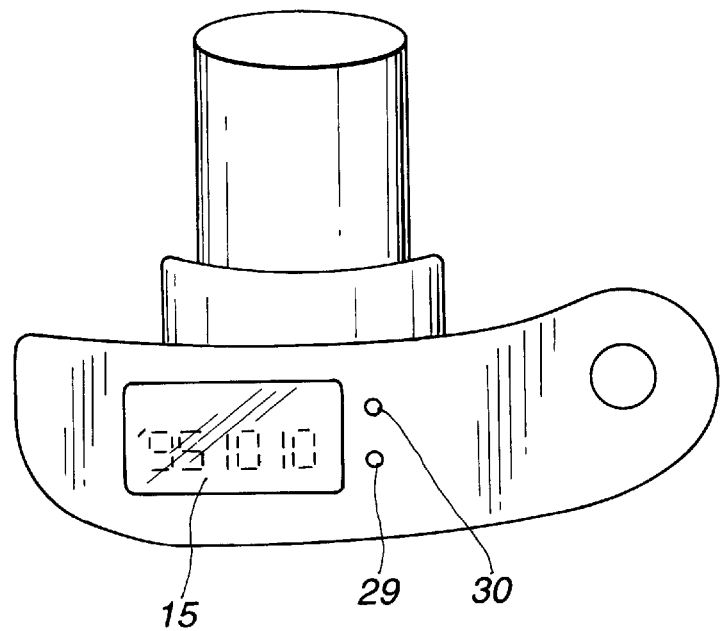
FIG. 8 is a top view of the camera provided with the failure detection and storage device, namely, the third embodiment of the present invention, and illustrates an example of an indication of a data and a time, at which an impact is made on the camera, on the screen of LCD (Liquid Crystal Display)

The date and time required to record information representing the date and time, at which the impact is detected, are obtained by utilizing the clock function of the date module 14. Namely, the CPU 11 receives the date-and-time information (or the clock information), which is obtained by utilizing the clock function, from the date module 14 at all times. Further, the CPU 11 causes the LCD 15, which is provided on the top surface of the main body of the camera as illustrated in FIG. 8, to display this clock information.

As above described, the two switches (namely, the mode switch 29 and the setting switch 30) are connected to the date module 14. Further, in the case that the mode switch 29 is operated, the format of indication of the date is changed. Moreover, in the case that the setting switch 30 is operated, the indication is set or put into a state in which the date is modified.

Figure 9:
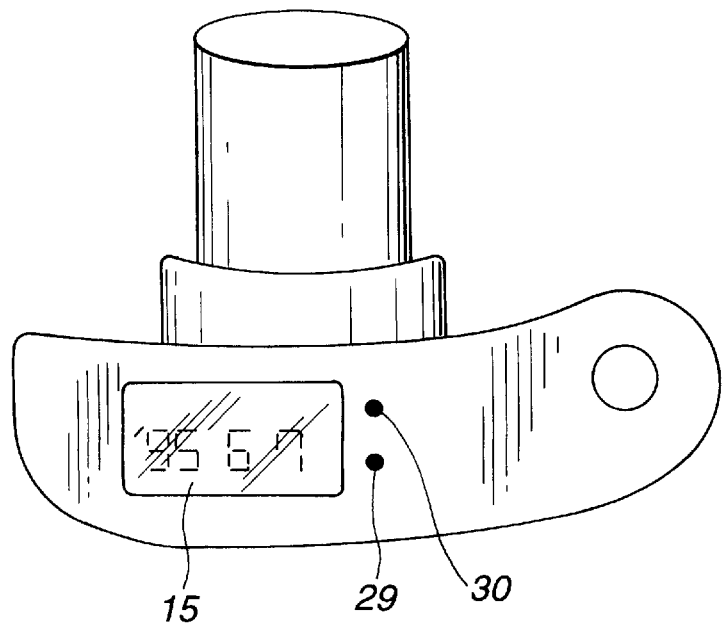
FIG. 9 is a top view of the camera provided with the failure detection and storage device, namely, the third embodiment of the present invention, and illustrates another example of an indication of a data and a time, at which an impact is made on the camera, on the screen of the LCD.

Furthermore, in the case of this embodiment, when both of the mode switch 29 and the setting switch 30 are simultaneously pushed, the LCD 15 displays the impact date and time, at which the impact is made on the camera, and which are stored in the EEPROM 13. Thus, the function of a display-changing switch is performed by simultaneously pushing both the mode switch 29 and the setting switch 30. Namely, the current date and time are usually displayed on the screen of the LCD 15 as illustrated in FIG. 8. However, when simultaneously pushing both the mode switch 29 and the setting switch 30, the impact date and time are displayed thereon as illustrated in FIG. 9.

Figures 10A, 10B:
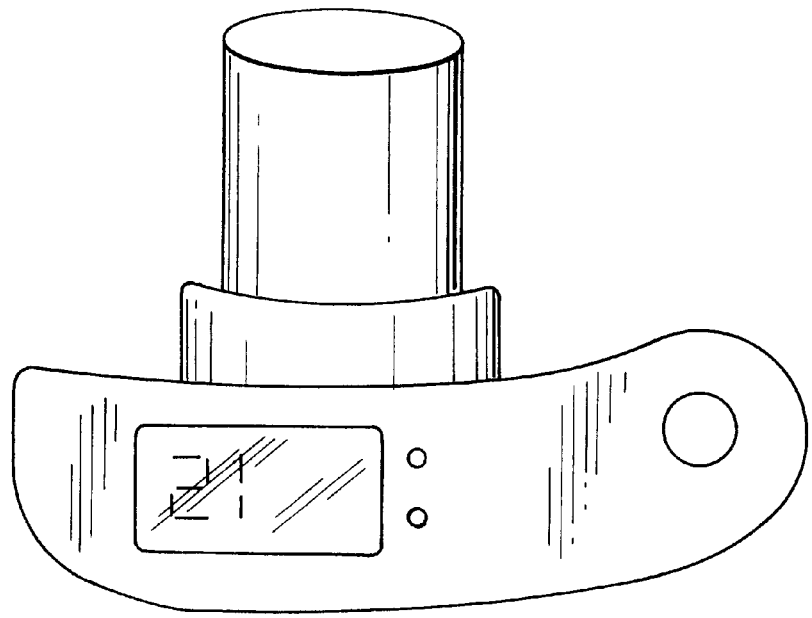
FIG. 10A is a top view of the camera provided with the failure detection and storage device, namely, the third embodiment of the present invention, and illustrates still another example of the contents of data representing an impact made on the camera, which is indicated on the screen of the LCD.
FIG. 10B is a diagram for illustrating an example of the contents of data representing impacts made on the camera which is provided with the failure detection and storage device, namely, the third embodiment of the present invention.

When repairing the camera, namely, this embodiment, LCD means, by which not only the checking of data stored in the EEPROM but the reading of information concerning an impact can be easily achieved, may be used as means, which is provided by a maker, for checking the contents of information concerning an impact. In such a case, if characters can be displayed on the screen of the LCD, the information concerning the impact is displayed thereon as it is. In contrast, if there is a limit to the display, only numbers respectively corresponding to parts, at which impacts are made, or to the contents of the information may be displayed thereon, as illustrated in FIGS. 10A and 10B. Incidentally, the clock function of the date module 14 is publicly known art. Thus, the detailed description of the clock function is omitted herein.

Thus, in the case of this embodiment, the date and time, at which an impact is made on the main body of the camera, can be stored and can be freely displayed. For example, when a camera, whose operations are abnormal, is sent to a repair shop as a disabled camera, a repairer usually spends much time and effort on the investigation of the cause of the failure, because the inside of the camera cannot be seen from the outside thereof. In the case of the camera according to this embodiment, the information concerning an impact is stored in the EEPROM, so that the cause of the abnormal operation can be easily found by reading the information corresponding to the place, on which the impact is made, from the EEPROM.

Figure 11:
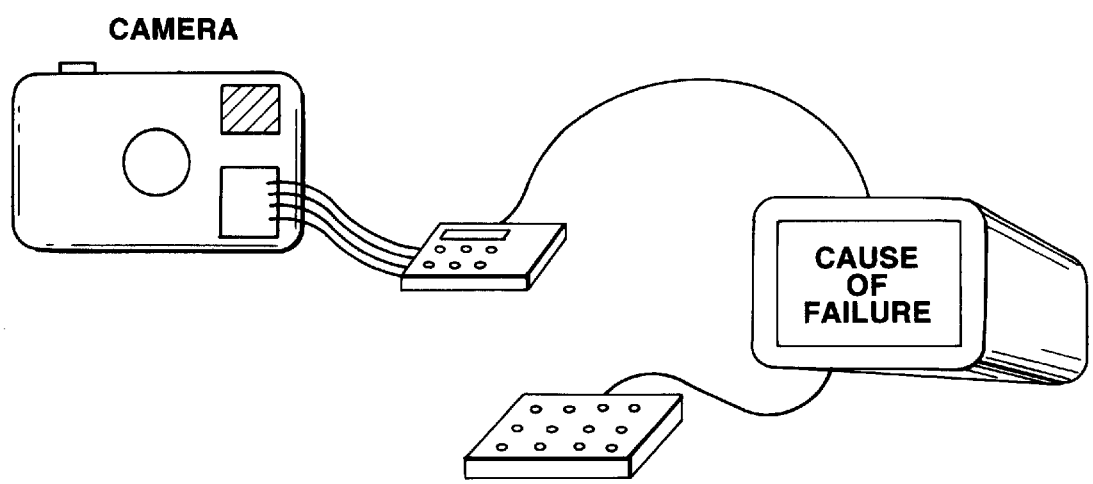
FIG. 11 is a diagram for illustrating means for reading information concerning the contents of data representing impacts from an EEPROM (Electrically Erasable Programmable Read-Only Memory) of the camera provided with the failure detection and storage device, namely, the third embodiment of the present invention.

At that time, at the repair shop or at the maker, as illustrated in FIG. 11, the main body of the camera is connected to a predetermined monitor through an adapter so as to read from the EEPROM the information concerning the impact. Thus, the cause of the failure can be displayed on the screen of the monitor. Further, as above described, the contents of the information concerning the impact are displayed on the screen of the LCD of the camera itself by operating the mode and setting switches 29 and 30.

Meanwhile, it can be fully expected that when using a camera while travelling, an impact has been made on the camera without being noticed during carrying or transporting the camera. However, it is usual that when noticing the abnormal operation of the camera or an abnormality in a picture, a user suspects a defect, which is contained in the main body of the camera, or a mistake, which is made in developing or printing film, of causing the failure of the camera. In the case of the camera according to this embodiment, it is stored and can be displayed that an impact having a predetermined level or more is made on the main body of the camera. This embodiment, thus, has advantages in that the investigation of the cause of the abnormality can be accurately and easily performed.

Next, the configuration and operation of means, which corresponds to the abnormality detection means of the first embodiment, of this camera, namely, the third embodiment will be described hereunder.

Figure 12:
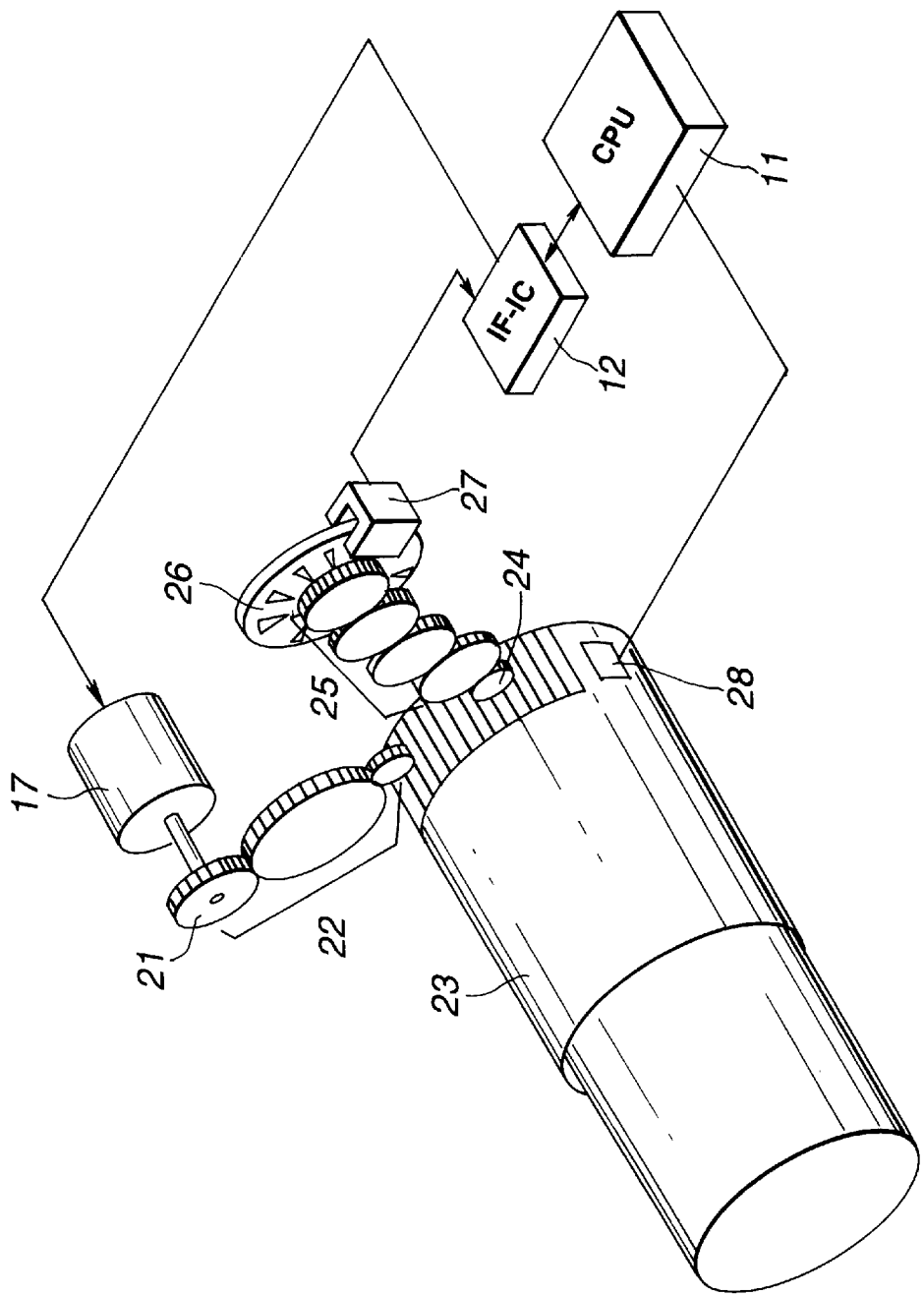
FIG. 12 is a conceptual diagram for illustrating abnormality detection means and its surrounding portions of the camera provided with the failure detection and storage device, namely, the third embodiment of the present invention.

FIG. 12 is a block diagram for illustrating abnormality detection means and its surrounding portions of the camera according to the third embodiment of the present invention.

As above described, the motor 17 is a lens-frame driving motor which is adapted so that when a zooming-up switch is turned on, the CPU 11 senses the condition of this switch and transmits a motor forward-rotation instruction to the IF-IC 12, as illustrated in FIG. 5. Thereby, the motor 17 rotates forward, so that the picture-taking lens frame is put into a telescopic condition. In contrast, if the zooming-down switch 19 is turned on, the motor 17 rotates reversely and is thus put into a wide-angle condition.

As shown in FIG. 12, in the case of the camera according to this embodiment, the turning force of a gear 21, which rotates by being linked with the rotation of the motor 17, is transmitted to an enclosure of the lens frame (namely, a rotating ring) 23 through a gear train 22. Further, the rotation of the rotating ring 23 is transmitted to an internally toothed disk (or wheel) 26 through a gear 24, which meshes with the rotating ring 23, and a gear train 25. A photointerrupter (a PI device) 27 is placed in the vicinity of this internally toothed disk 26. Further, a signal being responsive to the rotation of the internally toothed disk 26 is outputted from the PI device 27. The output signal of the photointerrupter 27 is sent to the IF-IC 12 whereupon the waveform of this signal is shaped. Then, the signal, whose waveform is shaped in the IF-IC 12 is transmitted to the CPU 11. Thereby, the zoom position of the lens frame is detected.

On the other hand, the aforementioned shock sensor 28 is placed on the rotating ring 23. Further, an output signal of the shock sensor 28 is inputted to the CPU 11.

Figure 13:
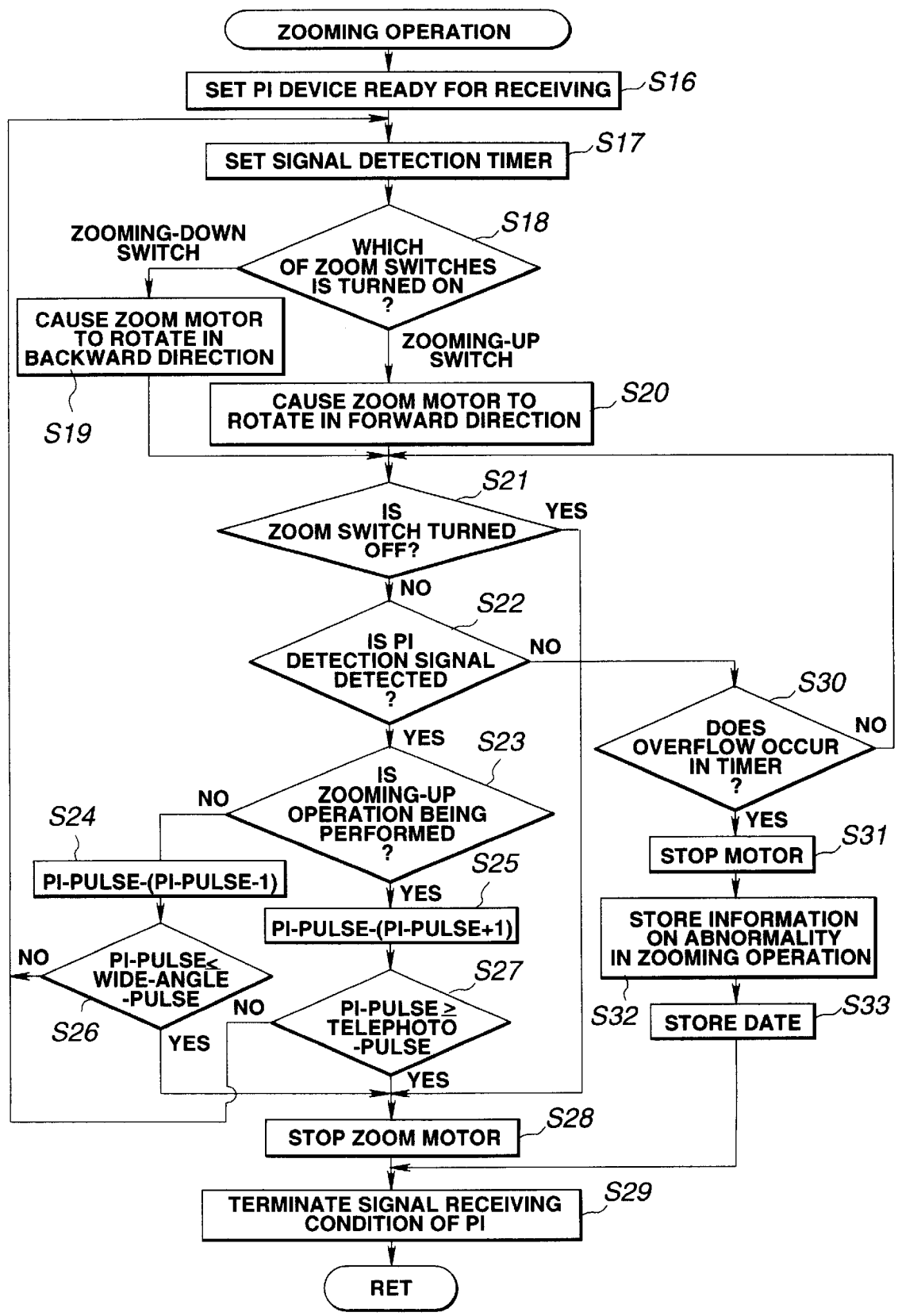
FIG. 13 is a flowchart for illustrating a zooming operation of the camera provided with the failure detection and storage device, namely, the third embodiment of the present invention.

Next, a zooming operation of the camera according to this embodiment will be described hereinbelow by referring to a flowchart of a program of FIG. 13.

First, the photointerrupter (namely, the PI device) 27 is set (in step S16) in such a manner as to be ready for receiving a signal. Then, a signal detection timer is established (in step S17). Thereafter, the motor 17 is driven (in steps S18, S19, S20) by transmitting a signal representing a driving direction of the motor 17, which is determined according to the state of the zoom switches (namely, the zooming-up switch 18 and the zooming-down switch 19), to the IF-IC 12. In the case when it is found (in step S21) that the zoom switches are turned off during driving the motor 17, this program advances to step S28 whereupon the zooming operation is terminated.

On the other hand, the turning force of the motor 17 is transmitted to the rotating ring 23 of the lens frame through the gear 21 and the gear train 22. Thus, the rotating ring 23 rotates. When the rotating ring 23 rotates, the internally toothed disk 26 is rotated through a gear 24 and a gear train 25. As a result of the rotation of this internally toothed disk 26, a signal corresponding to the zoom position of the lens frame is outputted from the photointerrupter 27.

The signal outputted from this photointerrupter 27 is transmitted the IF-IC 12 whereupon the waveform of this signal is shaped. Subsequently, the wave-shaped signal is transmitted to the CPU 11. This signal is important in understanding the state of the zooming operation. Further, it is judged in step S22 whether or not this signal is present.

Figure 14A:
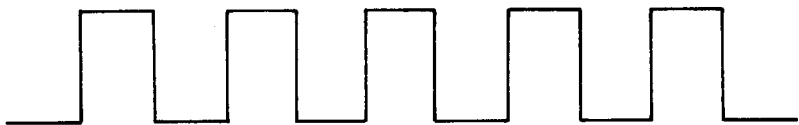
FIGS. 14A and 14B are diagrams for illustrating examples of the waveforms of output signals of a photointerrupter (PI) of the abnormality detection means of the camera provided with the failure detection and storage device, namely, the third embodiment of the present invention.
Figure 14B:

FIGS. 14A and 14B respectively illustrate examples of the waveforms of output signals of the photointerrupter 27.

As shown in these figures, in the case of an ordinary zooming operation, a signal, whose waveform alternately has the "H"-level and the "L"-level (see FIG. 14A), is outputted from the photointerrupter 27 owing to the presence of the teeth of the internally toothed disk 26. Further, in the case that this output signal has the waveform (as illustrated in FIG. 14B), whose signal level is maintained at the "H"-level for a time period, which is longer than a predetermined time, and does not become the "L"-level for this time period, an abnormality, in which no photointerrupter signals are detected in steps S22 and S23, is regarded as occurring.

Such an abnormality is caused, for example, in the case that a gear is disengaged from the gears of the gear train 25. Namely, although the rotating ring 23 is rotated by being driven by the motor 17, the internally toothed disk 26 does not rotate in the case that a gear is disengaged from the gear train 25 provided at the side of the photointerrupter 27. Thus, the photointerrupter 27 cannot output a signal. The state, in which the photointerrupter 27 outputs no signals in this manner even when the motor is driven, is abnormal. Consequently, this program advances to step S30. If the zooming operation is continued by maintaining this abnormal state, the motor 17 keeps driving the gear without knowing the situation of the zooming operation. Finally, when the rotating ring 23 reaches the limit of rotation thereof, the lens frame is broken.

Thus, in the case of this embodiment, as countermeasures to the destruction of the lens frame, when detecting an abnormality (in step S30), the CPU 11 stops the operation of driving the zoom motor (in step S31). The CPU 11 further causes the EEPROM 13 to store information concerning this abnormality and the date and time at which this abnormality occurs (in steps S32 and S33).

If the signal is normally outputted from the photointerrupter 27 in step S22, this program advances to step S23. Then, the number of pulses outputted from the photointerrupter 27 is counted. Further, when the counted number reaches the telescopic-side maximum number of pulses or the wide-angle-side minimum number of pulses, the CPU 11 stops the rotation of the zoom motor (in steps S24, S25, S26, S27 and S28). Furthermore, finally, the signal receiving condition of the photointerrupter 27 is terminated (in step S29).

The abnormality detection operation has been described hereinabove. Further, an operation of displaying the stored information is similar to the display process performed in the aforementioned impact detection operation. Thus, the description of the operation of displaying the store information is omitted herein.

Thus, in the case of the camera according to this embodiment, a zooming-operation abnormality can be detected as a result of detecting the output signal of the photointerrupter. In this case, when repairing the camera, a repairer can pay attention to whether or not there are no abnormalities in the gear trains, the rotating ring, the internally toothed disk and the photointerrupter. Consequently, the repairing operation can be smoothly performed.

Moreover, if information concerning the conditions of an impact and the date and time, at which the impact occurs, are stored in the shock sensor 28 provided in the lens frame, it is shown from this information that an impact is made on the lens frame. Further, this reveals that the impact is the cause of the failure. Thus, when using the camera, the attention of a user can be attracted to the impact. For example, the following case is assumed.

Namely, it is assumed that an inner part of the lens frame is broken down by (probably accidentally) making the lens frame of an unused camera collide with a wall or the like, and that because the user cannot check the breakage of the inner part thereof from the outside thereof, the user takes an important picture (for example, a commemorative picture) by judging that the failure of the camera is caused. At that time, seemingly, the picture-taking operation is normally performed and is finished without accident. It is further assumed that thereafter, the user does not know the occurrence of the failure of the picture-taking owing to the failure of the camera until the developing and printing of film are carried out.

In such a case, when using the conventional camera, the user may accuse the maker that the camera is imperfect. Further, the user may sue the maker for damages corresponding not only to the camera but to the commemorative picture.

In contrast, in the case of the camera, which is provided with the failure detection and storage device, according to this embodiment, the impact made on the lens frame is detected and recorded by the impact detection device. Thereby, it can be proved that the aforementioned accident is responsible to the user.

Further, the camera, which is provided with the failure detection and storage device, according to this embodiment can be realized by adding the impact detection device and some specifications to the conventional camera.

Moreover, the display means may be adapted to display not only the information concerning the failure, the abnormality and the date and time but also the cautions to the user, for instance, a message for encouraging the user to bring the product to a repair shop after a failure thereof is detected.

Next, a fourth embodiment of the present invention will be described hereinbelow.

Figure 15:
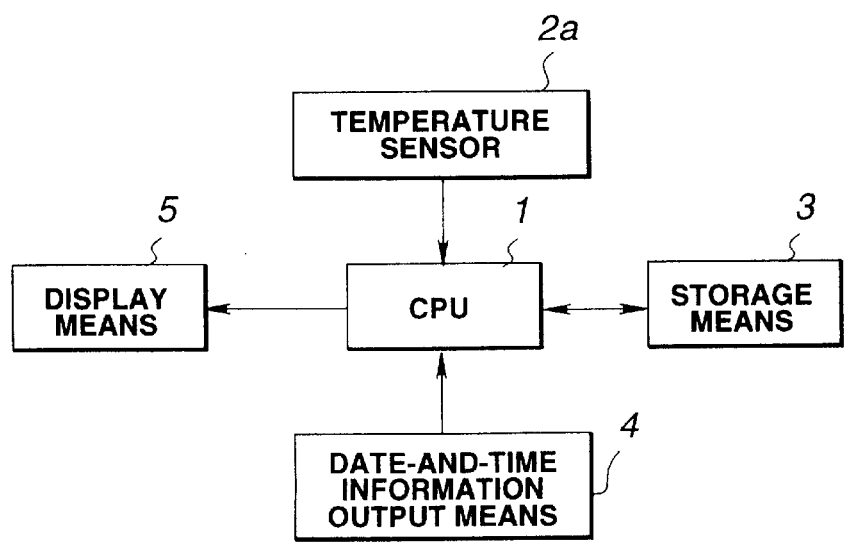
FIG. 15 is a block diagram for illustrating the basic configuration of still another failure detection and storage device embodying the present invention, namely, a fourth embodiment of the present invention.

FIG. 15 is a block diagram for illustrating the basic configuration of still another failure detection and storage device embodying the present invention, which is the fourth embodiment of the present invention.

In the case of the aforementioned failure detection and storage device, which is the first embodiment, the ill influence of a damage is detected. However, the cause of the fault of the apparatus is not limited to the impact made thereon. For example, a change in environmental conditions such as ambient temperature and humidity of the apparatus may be the cause of the failure thereof.

In view of the fear that the change in ambient temperature of the apparatus causes a fault or failure thereof, the failure detection and storage device according to the fourth embodiment is provided with a temperature detection means 2a instead of the damage detection means. The remaining composing elements and operations of the fourth embodiment are similar to the corresponding elements and operations of the first embodiment. Therefore, a detailed description of the remaining composing elements and operations of the fourth embodiment is omitted herein.

Namely, as illustrated in FIG. 15, one or more temperature sensors 2a are provided at the predetermined places on the apparatus. Further, the CPU 11 monitors outputs of this sensor successively. Thereby, similarly as in the case of the first embodiment, it can be judged that the apparatus is under severe conditions.

Figure 16:
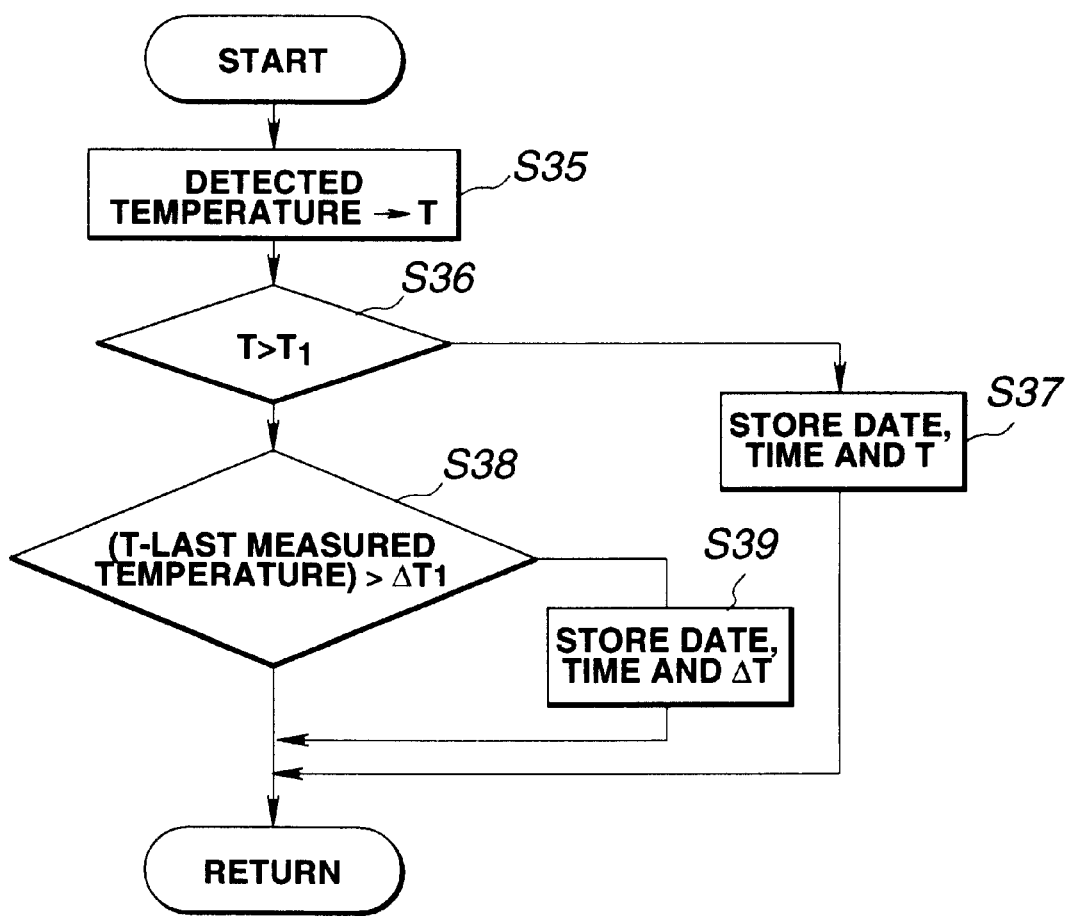
FIG. 16 is a flowchart for illustrating an operation of the failure detection and storage device embodying the present invention, namely, the fourth embodiment of the present invention.

Next, an operation of the fourth embodiment having such a configuration will be briefly described hereunder by referring to a flow chart of a program of FIG. 16.

First, the CPU 1 receives temperature information, which represents the temperature of the apparatus, from the temperature detection means 2a and employs a temperature represented by the received information as a temperature T (in step S35). Then, the CPU 1 compares the temperature T with a predetermined reference temperature T1 preliminarily stored in the storage means 3 (in step S36). Here, if the temperature T is higher than the reference temperature T1, the CPU 1 judges that there is a fear that an abnormality occurs in the apparatus. Further, the CPU 1 causes the storage means 3 (in step S37) to store information that represents the date and time, at which the abnormality occurs, and represents the temperature T. Then, this program returns the CPU 1 to a called program.

In contrast, if it is found that the temperature T is lower than the reference temperature T1, the CPU 1 obtains the difference between the current temperature T and the last measured temperature and further judges (in step S38) whether or not this temperature difference is larger than a reference temperature difference $\Delta T$. Hereat, if the obtained temperature difference is larger than a reference temperature difference $\Delta T$, this means that an abrupt change in temperature is caused. Thus, in this case, the CPU 1 similarly judges that there is a fear that an abnormality occurs in the apparatus. Further, the CPU 1 causes the storage means 3 (in step S39) to store information that represents the date and time, at which the abnormality occurs, and represents the temperature T. Then, the program of this figure returns the CPU 1 to a called program.

Incidentally, the reference temperature T1 and the reference temperature difference $\Delta T$ are preliminarily stored in, for example, the storage means 3.

Further, in the case of the fourth embodiment, the ambient temperature is detected when the apparatus is in the environment in which the ambient temperature is higher than the reference temperature. The present invention is not limited to such a condition. For instance, when the apparatus is in the environment in which the ambient temperature is higher than the reference temperature, the ambient temperature may be detected and further, information representing the detected temperature may be stored.

Thus, in the case of the fourth embodiment, similarly as in the case of the detection of the impact in the first embodiment, a commodity product having a sense of relief can be provided by predicting a fear of a failure of a part, which is hard to electrically check, through the use of the temperature sensor instead of the damage detection means. Moreover, similarly, the cause of a failure can be easily determined. Consequently, there can be provided a commodity product which can be repaired quickly.

Furthermore, this embodiment may be provided with humidity detection means instead of the temperature detection means 2a, so that another kind of a cause of a failure can be determined by detecting and recording an output level of the humidity detection means and a rate of change in the output level thereof.

As described above, in the case of the first to fourth embodiments, the products themselves can store information that concerns: the conditions in which a failure of a product may occur; the date and time at which a failure occurs; and parts, in which failures are caused, of the products. Especially, in the case that these embodiments are applied to portable devices such as a camera, a video camera (namely, a cameracorder) and a portable radio, and to vehicles such as an automobile, judgements on the causes of operation failures and abnormalities and on where the responsibility lies can be facilitated by displaying the causes of the failures and the responsible person or party. Consequently, there can be provided products which can give users a sense of relief or easiness.

Furthermore, products, to which the present invention is applied, can provide to the maker information concerning conditions and parts, in which failures are liable to occur. Additionally, the quality of the products of such a kind can be further improved. Further, a reliable repair based on quick and accurate judgments on the conditions can be achieved.

Figure 17:
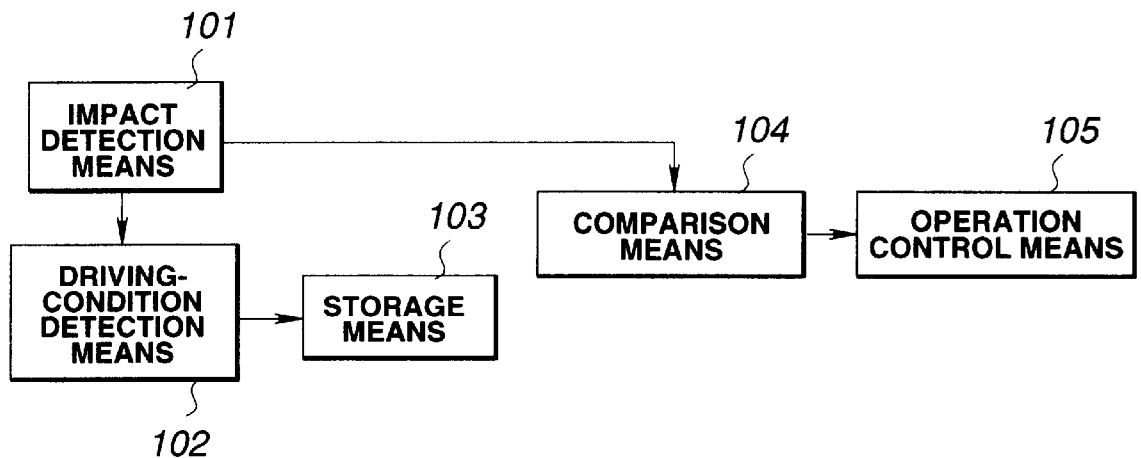
FIG. 17 is a block diagram for illustrating the configuration of an impact detection function portion according to the present invention, namely, a fifth embodiment of the present invention.

Next, a fifth embodiment of the present invention will be roughly described hereunder with respect to FIG. 17.

This impact detection camera is mainly composed of the following elements: impact detection means 101 for mechanically, optically or electrically detecting an impact made on the camera (not shown); driving-condition detection means 102, which is connected to this impact detection means 101 and is used for detecting the driving condition of a composing element, namely, of a driving mechanism on the basis of an output of the impact detection means 101; and storage means 103 that is connected to this driving-condition detection means 102 and preliminarily stores a value represented by an output signal of the corresponding driving-condition detection means 102, which is in a state in which the camera is in a normal condition.

Further, as illustrated in FIG. 17, this impact detection camera further has comparison means 104 that is connected to the aforementioned impact detection means 101, the driving-condition detection means 102 and this storage means 103 and is used for comparing a value, which is represented by an output signal of the driving-condition detection means 102 and is preliminarily stored in the storage means 103 corresponding to the composing element on which a impact is made, with a value of an output signal issued from the driving-condition detection means 102 after the detection of the impact, in the case that this impact detection means detects the impact.

Incidentally, the impact detection means 101 provided for detecting an occurrence of an impact serving as a failure factor of the camera is placed at a place at which, for example, a lens-barrel, a lens and a clutch mechanism, which are employed as three objects to be detected, can be detected.

An operation control means 105 for selectively driving at least one of the lens-barrel, the lens and the clutch mechanism is provided so as to make a judgment for detecting an abnormality in the driving operation after an impact is detected by the impact detection means 101. The operation control means 105 performs predetermined fundamental operations and causes each of the composing elements of the camera to operate, on the basis of a predetermined judgment made according to a result of the comparison, which is received from the comparison means 104, so as to control the initialization operation of each of the composing elements.

An operation and effects of this fifth embodiment will be described hereunder. When impacts made on the lens-barrel, the lens and the clutch mechanism are detected by the impact detection means 101, outputs of the impact detection means 101 are supplied not only to the driving-condition detection means 102 but also to the comparison means 104. For instance, the drawing-out or the drawing-in of the lens-barrel and the lens is performed on at least one of the lens-barrel and the lens, at which an impact is detected, as a mechanism initialization operation. The driving-condition detection means 102 measures the "movement (or travelling) speed", which is involved in this driving condition, of each of the parts and then outputs a signal representing the measured "movement speed" to the comparison means 104. Further, similarly, the clutch mechanism is caused to perform a predetermined changing (or switching) operation and so on.

Meanwhile, data representing the "movement speed" in the case of normally driving the lens-barrel, the lens and the clutch mechanism is preliminarily stored in the storage means 103 as data in the case of a normal driving operation. Thus, the comparison means 104 compares what is called the "normal speed" stored in this storage means 103 with the speed of each of the parts, which is obtained posterior to the generation of the impact detected when performing the mechanism initialization operation. A signal representing a result of this comparison is sent therefrom to the operation control means 105 whereupon the predetermined control operations are performed.

Namely, in the case that an abnormal driving-condition is detected in at least one of the lens-barrel, the lens and the clutch mechanism, at which impacts are detected, the operation of the camera is controlled so that each of the parts thereof is on safe side. To minimize a trouble caused in the camera owing to the abnormality, the checking is performed mainly on important parts, which are vulnerable to impacts, and are completed in a short time period. Consequently, occurrences of a fault and a operation trouble of the camera can be prevented.

Next, a sixth embodiment of the present invention will be described in detail hereinbelow by referring to FIGS. 18 through 27.

Figure 18:
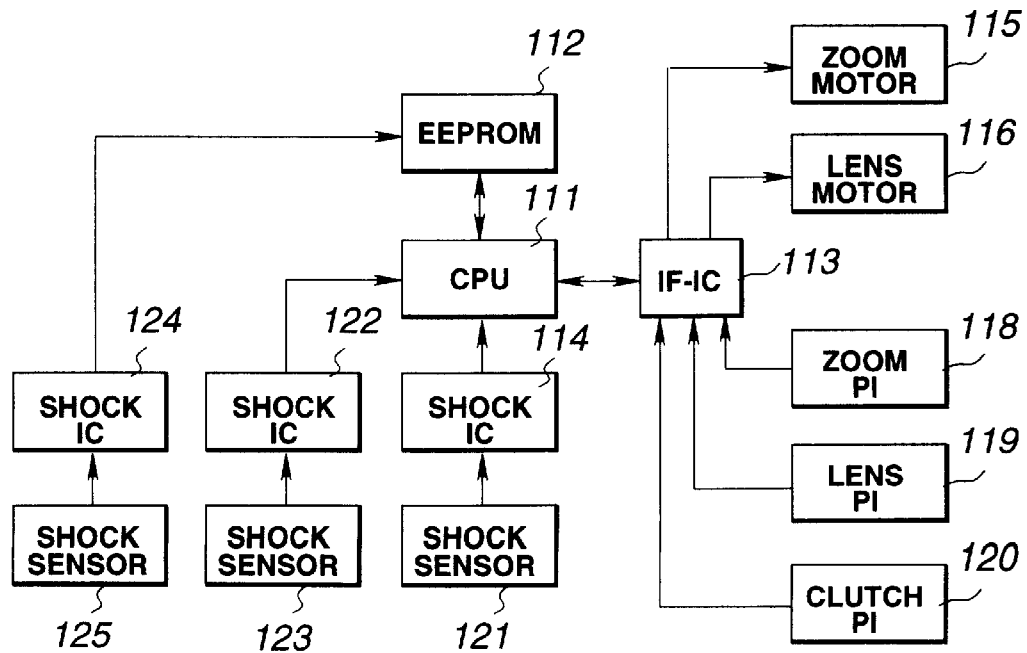
FIG. 18 is a block diagram for illustrating the configuration of an electrical control system for detecting a failure of a camera, which is a sixth embodiment of the present invention.

Referring first to a block diagram of FIG. 18, there is shown the configuration of the sixth embodiment. An impact detection camera according to this embodiment is composed of the following electrical elements.

Namely, a microcomputer (hereunder referred to as CPU) 111 is used as the nucleus. Further, an electrically rewritable memory (namely, EEPROM 112), IF-IC 113 for driving the mechanisms of each primary part of the camera (to be described later), a plurality of shock ICs 114, 122 and 124 for amplifying signals sent from a plurality of shock sensors 121, 123 and 125 for detecting impacts are connected to the CPU 111.

Particularly, a lens-barrel driving zoom motor 115, a taking-lens driving lens motor 116, a zoom photointerrupter (hereunder abbreviated as zoom PIs) 118, which is operative to output a signal representing a driving speed correspondingly to the driving of such composing elements and a lens PI 119 are connected to the IF-IC 113.

The shock ICs 114, 122 and 124 amplify signals sent from the shock sensors 121, 123 and 125 for detecting impacts, respectively, and further send the amplified signals to the CPU 111. Incidentally, usually, the shock sensor can detect a displacement in one direction. Thus, in the case of detecting a three-dimensional movement, namely, detecting a movement in each of X-direction, Y-direction and Z-direction, there is the necessity of three sets of a shock IC and a shock sensor. Therefore, in this embodiment, three sets of a shock IC and a shock sensor are provided. Namely, the set of the shock IC 122 and the shock sensor 123 and the set of the shock IC 124 and the shock sensor 125 are provided in this embodiment in addition to the set of the shock IC 114 and the shock sensor 121.

The zoom motor 115 performs both of a lens-barrel driving operation and a film-feed driving operation. Namely, the selective switching of the driving force of the motor to the lens-barrel side and to the feeding side is performed by the zoom motor 115 through the clutch mechanism (to be described later). The clutch PI 120 outputs a predetermined switch driving speed signal to the IF-IC 113 (see FIG. 26).

Further, the lens motor 116 moves the picture-taking lens in the aftermentioned manner by means of the predetermined movement mechanism. This movement is detected by the lens PI 119 which outputs a signal, which corresponds to this movement, to the IF-IC 113 (see FIG. 25).

Figure 19:
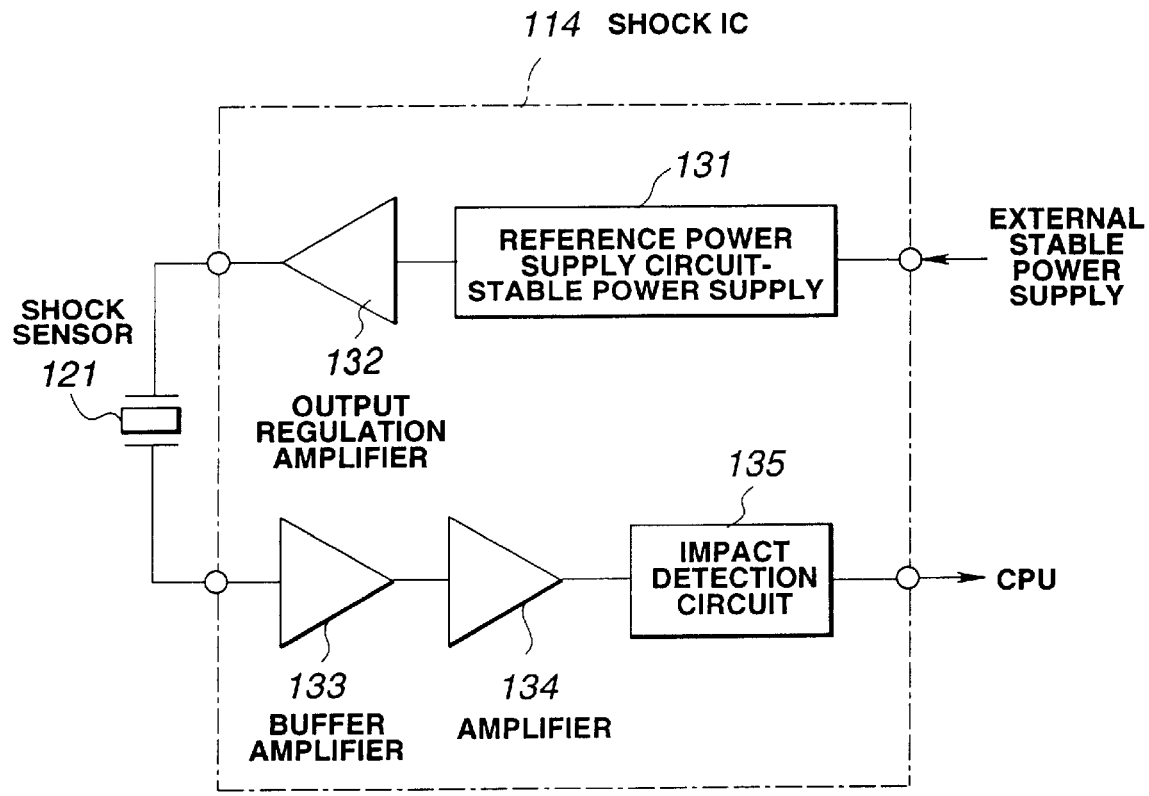
FIG. 19 is a diagram for illustrating the configuration of an impact detection mechanism and its electrical circuit of the sixth embodiment of the present invention.

Next, the shock IC serving as an impact detection mechanism for detecting an impact will be described by referring to FIG. 19.

This shock IC 114 is driven on the basis of the power supplied from the external stable power supply and is connected to the CPU 111 and the shock sensor 121.

Incidentally, this shock sensor 121 is an extremely small two-terminal part and has a structure in which ceramic substrates are glued to the top and bottom surfaces of a bimorph device, respectively. When an impact is made on this shock sensor 121, the shock sensor 121 directly detects the impact and sends an impact signal to the CPU 111 through the C 114.

As shown in this figure, this amplifying IC 114 consists of a reference power supply circuit 131, an output regulation amplifier 132, a buffer amplifier 133, an amplifier (AMP) 134 and an impact detection circuit 135.

A reference voltage for the shock sensor 121 is supplied from the reference power supply circuit 131 for supplying stable power to the main body of the camera, through the output regulation AMP 132. An ordinary output in the case of the absence of an impact to be detected by the shock sensor 121 is this reference voltage. If an impact is detected, an impact signal is issued and inputted to the amplifier 134 through the buffer amplifier 133. Further, the signal level of the signal is amplified to the input level of the impact detection circuit 135. Then, the amplified signal is outputted to the CPU 111.

Figure 20:
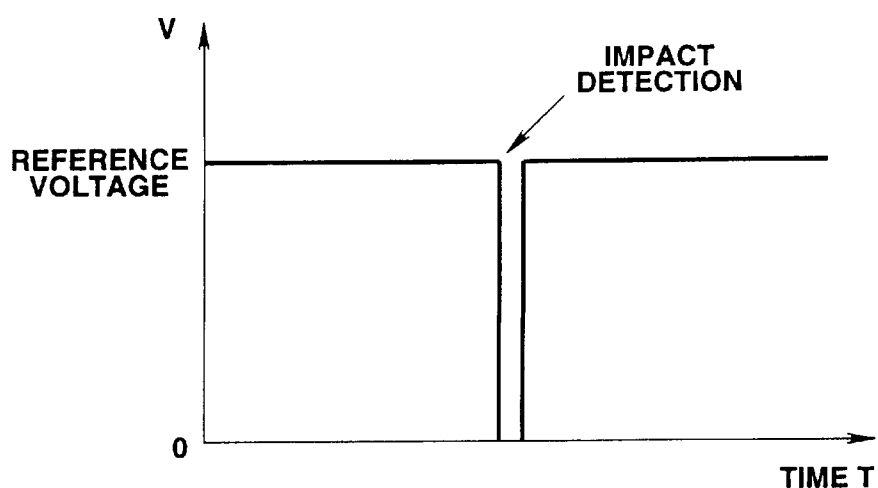
FIG. 20 is a graph for illustrating change in reference voltage applied to a shock IC (Integrated Circuit) before and after an impact is detected by the shock sensor of the sixth embodiment of the present invention.

Here, a graph of FIG. 20 illustrates a change in the waveform of the signal which is outputted to the CPU 111 from the shock IC 114 before and after the aforementioned impact is made on the camera. When no impact is made on the camera, the signal outputted from the shock IC 114 has the constant reference voltage as above described. However, at a moment when an impact is detected by the shock sensor 121, the signal outputted from this shock IC 114 has a voltage of 0 volts. Namely, an instantaneous voltage drop takes place, as shown in this graph. Then, it is not long before the voltage of the signal returns to the normal reference voltage. Thus, the moment, at which the impact is generated, can be known from this change in the voltage.

Figure 21:
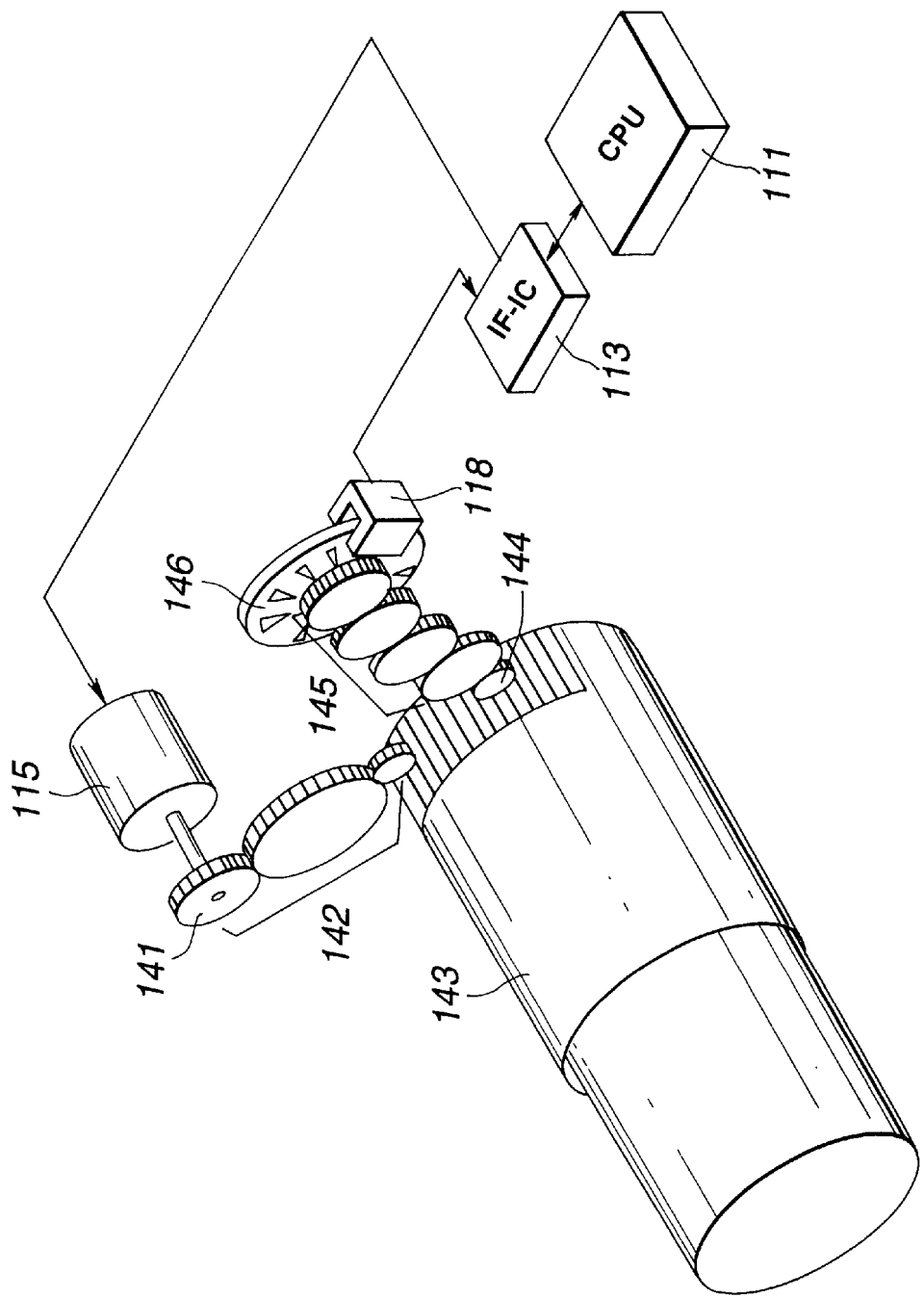
FIG. 21 is a conceptual diagram, partially in perspective for illustrating the relation among a lens-barrel, a driving mechanism therefor and electrical circuit elements of the sixth embodiment of the present invention.

FIG. 21 schematically illustrates the configurational relation among the CPU 111, the IF-IC 113 and the lens-barrel.

As above described, the CPU 111 is connected to the IF-IC 113 to which the zoom motor 115 and the zoom PI 118 are connected. The driving force of the gear 141, which rotates by being linked with the rotation of this zoom motor 115, is transmitted to the enclosure (hereunder referred to as the rotating ring) 143 of the lens-barrel through the gear train 142. When this rotating ring 143 rotates in the predetermined direction, the lens-barrel enclosing the picture-taking lens is put into the telescopic condition. In contrast, when rotating the ring 143 in the reverse direction, the lens-barrel is put into the wide-angle condition.

The driving state of this lens-barrel can be checked by detecting the rotation conditions of the gear 144, which rotates in response to the rotation of the rotating ring 143, and the internally toothed disk 146, which rotates through the gear train 145. The zoom PI 118, which can optically detect the number of teeth-like slits, is provided in the vicinity of this internally toothed disk 146. Thus, a signal, whose waveform corresponds to the rotation of this internally toothed disk 146, is outputted. Further, when sent to the IF-IC 113, the waveform of a signal outputted from the zoom PI 118 is shaped. Then, such a signal is sent the CPU 111.

Here, FIG. 22 illustrates the waveform of a normal output signal of the zoom PI 118. In the case that the lens-barrel is driven in the aforementioned way, the signal outputted by the zoom PI 118 has the waveform as shown in this figure, when received by the CPU 111.

As is understood from the waveform shown in this figure, the signal outputted from the zoom PI 118 is at predetermined constant frequency and period in the case of the ordinary zooming operation. However, for instance, in the case that the camera is carelessly dropped and what is called a "stress" (namely, a load such as a pressure due to the impact), which is not less than a predetermined level, is imposed on the lens-barrel, the rotational speed of the aforementioned rotating ring becomes low in comparison with that in the normal case. Thus, the rotational speed of the internally toothed disk 146, which rotates in response to the rotation of the rotating ring, becomes low. Consequently, a change of the frequency of the signal, whose period is not constant, occurs.

Moreover, FIG. 23 illustrates the aforementioned abnormal waveform. After an abnormality occurs in the lens-barrel driving operation, the zoom PI 118 produces a signal having a waveform, in which the duration of each pulse varies, as illustrated in the graph (or waveform diagram) of this figure. As is seen from this figure, the periods between a leading edge e1 and a trailing edge e2 and between a trailing edge e2 and a leading edge e3 are long in comparison with the duration of each pulse in the case of the aforementioned normal waveform. Namely, it can be judged from the instability of the frequency of the signal produced by this zoom PI 118 that some failure, by which the driving operation of the lens-barrel including a lens driving system is not normally performed.

Figure 24:
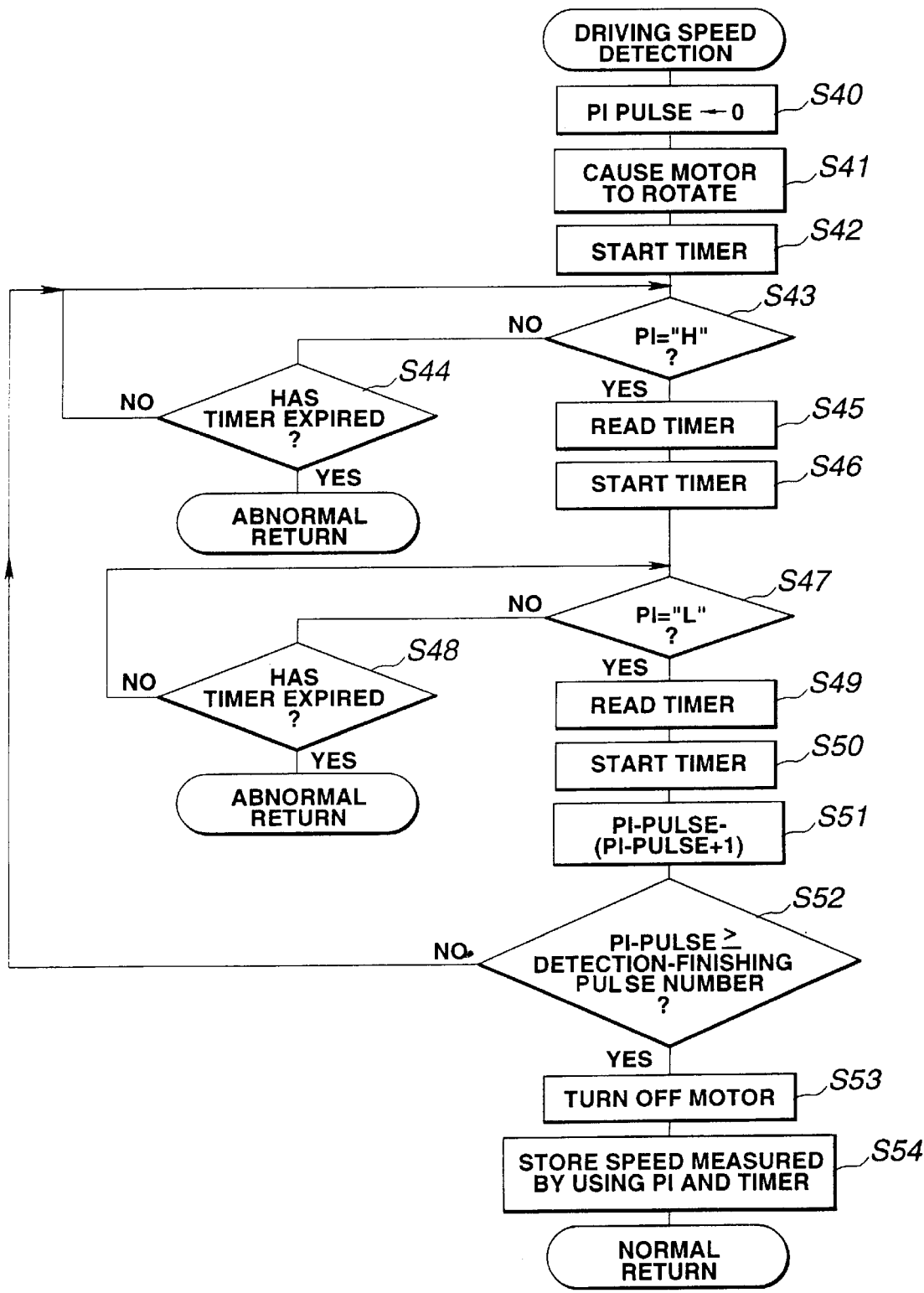
FIG. 24 is a flowchart for illustrating a "driving-speed detection" procedure to be followed by executing a subroutine therefor in the sixth embodiment of the present invention.

The flowchart of FIG. 24 illustrates a subroutine for measuring and detecting an output signal representing a driving speed in the case that the aforementioned lens-barrel driving operation is normally performed, and for knowing an occurrence of a change in the waveform of this signal. This subroutine is a processing routine or program to be called by the main routine (to be described later see FIG. 27).

First, a PI pulse counter for counting the number of pulses of the signal outputted by the zoom PI is cleared to zero (in step S40). Subsequently, the zoom motor for driving the lens-barrel is driven and rotated (in step S41). Then, a speed detection timer is started (in step S42).

Next, for the purpose of detecting the state of the signal outputted by the zoom PI 118 when starting the driving of the motor, it is checked (in step S43) whether or not the signal level of the signal outputted by the zoom PI 118 is the "H"-level. If the signal level is the "L"-level (namely, a Low level), the apparatus waits until the signal level changes to the "H"-level. However, in the case that the speed detection timer counts out, the CPU 111 judges (in step S44) that the rotating ring does not rotate for a predetermined time period and that an "abnormality" occurs. Hereat, the value of the speed detection timer having counted out is also used as a abnormal timer count at the time when the signal from the zoom PI 118 is stopped, namely, the rotating ring does not rotate.

In the case that the "H"-level signal outputted from the zoom PI 118 is detected in step S43, this subroutine advances to the next step S45 whereupon the value of the count indicated by the timer started in step S42 is read and is saved in the random access memory (RAM) of the CPU 111. Thereafter, the timer is restarted (in step S46). Thus, the time is measured until the arrival of the next edge of the waveform.

Subsequently, in step S47, it is detected whether or not the signal level of the signal outputted by the zoom PI 118 changes from the "H"-level to the "L"-level. Here, if the timer started in step S46 counts out during the time the apparatus waits for a change of the waveform, it is judged (in step S48) that an "abnormality" occurs.

In contrast, if the "L"-level of the signal level is detected in step S47, the value of the count indicated by the timer is read (in step S49). Then, the read value is saved in the RAM of the CPU 111. Subsequently, the timer is restarted (in step S50). Incidentally, the restarting of this timer is performed so as to measure a time until the arrival of the next edge.

After the count or the number of the pulses of the PI signal (namely, the signal outputted from the PI) is incremented by 1 (in step S51), it is checked (in step S52) whether or not the number of the pulses generated by the PI exceeds a detection-finishing pulse number. Incidentally, this "detection-finishing pulse number" is defined as the total number of the pulses of the PI signal for measuring a time between adjacent edges of the pulses of the PI signal during driving the motor. If the count or the number of the pulses of the PI is less than the detection-finishing pulse number, this subroutine returns to step S43. Thus, the driving operation and the speed detection are continued.

The procedure described hereinabove will be further described in detail hereunder by referring to the normal waveform of FIG. 22. The first leading edge e1 is detected in step S43 of FIG. 24. The subsequent trailing edge e2 is detected in step S47. The time period between the detection of the edge e1 and that of the edge e2 is a time period from the moment, at which the timer is started, to the moment at which the value indicated by the timer is read in step S49. Further, a time period between the trailing edge e2 and the subsequent leading edge e3 is a time period from the moment, at which the timer is started in step S50, to the moment at which the value indicated by the timer is read (in step S45) after the next "H"-level is detected in step S43. In this way, the time period between two adjacent edges is measured over several edges.

If the count or the number of the pulses of the PI signal is not less than the predetermined detection-finishing pulse number, this subroutine advances to step S53 whereupon the driving of the zoom motor is finished. Then, information representing the speed measured by using the PI is stored in the EEPROM 112 (in step S54).

The routine for a "driving speed detection operation", which includes the aforementioned sequence of steps, may be executed every time when driving the lens-barrel. However, instead of this, the driving speed may be measured only one time at the time of the normal driving by storing data concerning the waveform of the signal corresponding to the speed at that time, for example, one of the interval between adjacent edges, the number of edge per unit of time, the corresponding frequency and the corresponding period.

Next, outlines of the driving of the picture-taking lens (for instance, the focusing) and the driving of the clutch mechanism will be given hereinafter by referring to FIGS. 25 and 26.

Figure 25:
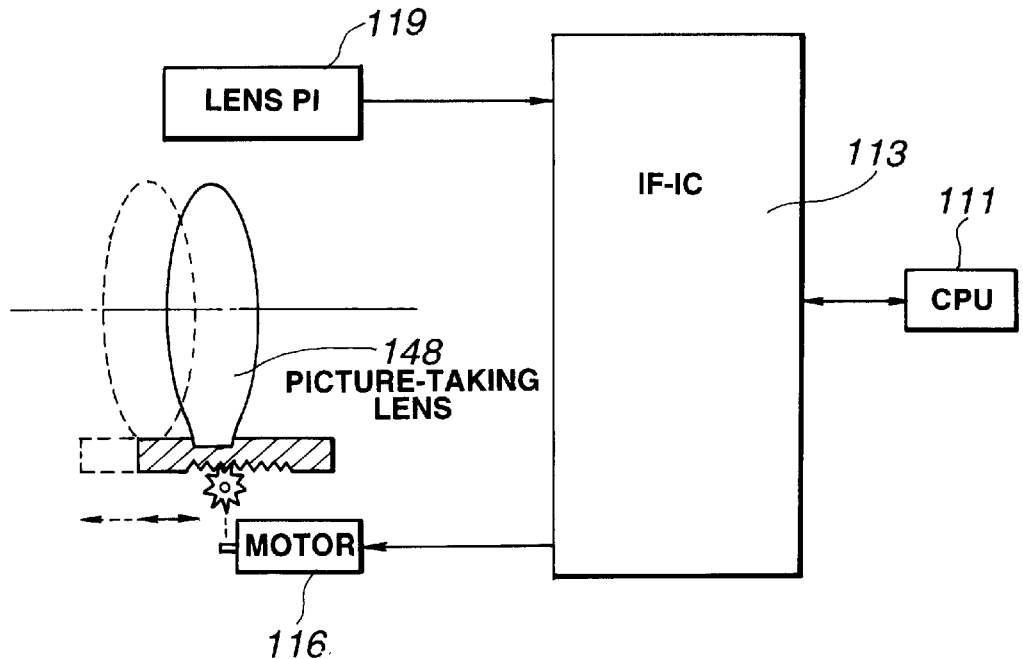
FIG. 25 is a conceptual diagram for illustrating the relation among parts of the sixth embodiment of the present invention, which are related to the driving of lenses thereof.

Referring first to FIG. 25, there are illustrated the configuration of a portion consisting of the composing elements concerned in the driving of the lens and the concept of the movement thereof.

Such a portion is composed of: a picture-taking lens 148 of the lens system of the camera; the combination unit of a rack and a pinion gear, on which this lens abuts; and the lens motor 116 for rotating this pinion gear. Further, such a portion is supplied with the power from the IF-IC 113 connected to the CPU 111 and is driven under the control thereof. On the other hand, the lens PI 119 for detecting the movement of this lens is provided in the proximity of the picture-taking lens 148 and sends out a signal to the CPU 111 through the IF-IC 113.

The focusing on an object is performed by driving the motor 116 in such a manner as to perform the parallel translation of this picture-taking lens 148 along the optical axis. The amount or distance of the movement of this lens is detected, for example, optically by the lens PI 119. In the case of this example, during driving the lens, a signal having a waveform similar to the waveform of pulses outputted by the zoom PI 118 of FIG. 22 is outputted from the lens PI 119.

Further, although the signal sent from the PI 119 is different in scale from the signal outputted by the zoom PI 118, the waveform of the former signal is similar to that of the latter signal. Therefore, the description of (the measurement of) the speed is omitted herein. Moreover, the measurement of the length of the time period between adjacent edges can be performed by also utilizing the procedure followed by executing the subroutine for the "driving speed detection operation" of FIG. 24.

Figure 26:
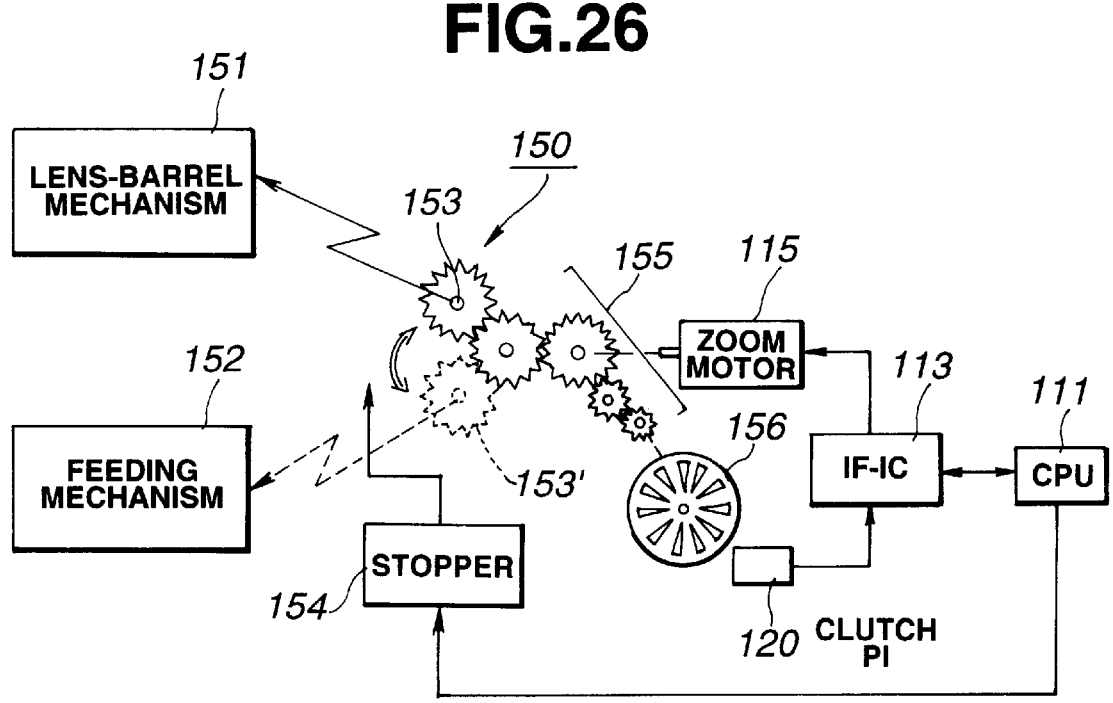
FIG. 26 is a conceptual diagram for illustrating the relation among a lens-barrel mechanism and a feeding mechanism of the sixth embodiment of the present invention, which are related to the driving of a clutch mechanism thereof.

Referring next to FIG. 26, there is schematically illustrated the composing elements concerned in the driving of the clutch mechanism. The aforementioned zoom motor 115 is used for the driving of the feeding mechanism 152 in addition to the driving of the lens-barrel mechanism 151 of the camera. Thus, the driving force of the zoom motor 115 is transmitted to each of the mechanisms by changing the gear 153 in the gear train between the zoom motor 115 and each of the mechanisms. This configuration is called "a clutch mechanism" 150. A gear 153 is a planetary gear and is meshed by a stopper 154 with a predetermined gear on the side of, for example, the lens-barrel mechanism 151 while selectively transmitting the driving force of the zoom motor 115 to the lens-barrel mechanism 151 or the feeding mechanism 152. When the stopper 154 is disengaged therefrom and the zoom motor 115 is driven, the gear 153 moves in such a manner as to mesh with a gear on the side of, for instance, the feeding mechanism 152. The amount of this movement is known from the signal outputted from the clutch PI 120. Similarly as in the aforementioned case of FIG. 21, an internally toothed disk 156, which rotates in response to the rotation of the predetermined gear, is provided in this portion. Output signals of the clutch PI 120 are outputted therefrom owing to the presence of slits of the internally toothed disk 156 at predetermined constant period and frequency.

Incidentally, as this driving signal, a signal having a waveform similar to the normal waveform produced by the zoom PI 118, is shown in FIG. 22. Thus, a similar description concerning this driving signal is omitted herein. Further, the measurement of the time period between adjacent edges of the signal can be performed by performing the procedure provided by executing the subroutine for the "driving speed detection operation".

Figure 27:
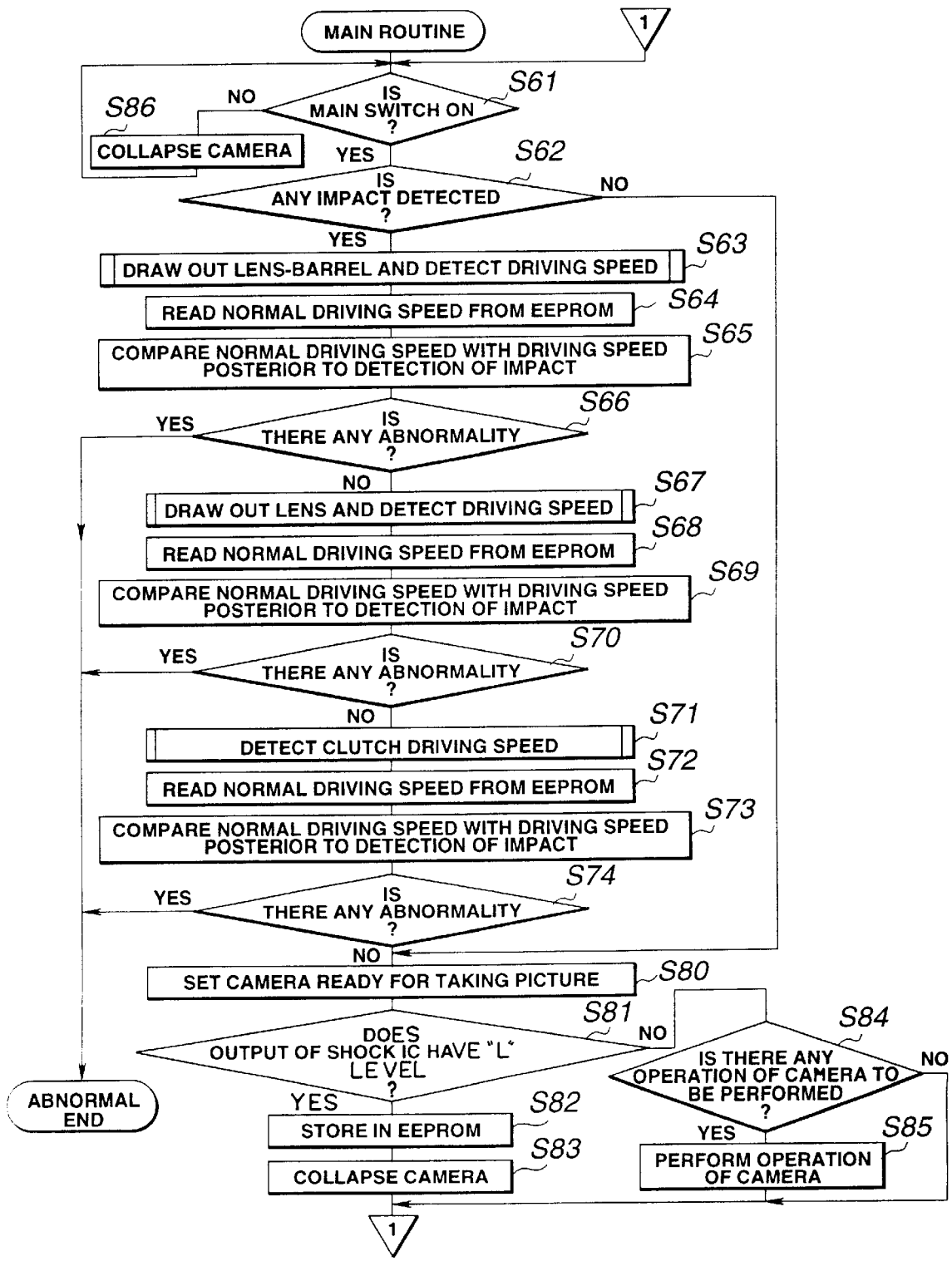
FIG. 27 is a flowchart for illustrating a procedure to be followed in the sixth embodiment of the present invention by executing a main routine for detecting a failure of the camera.

Next, the processing to be performed after the detection of the impact will be described hereinbelow by referring to the flowchart of the main routine of FIG. 27.

First, the operating condition of the main switch of the camera is detected in step S61. If this main switch is turned on, an impact detection is performed in step S62 so as to check whether or not an impact is made on the camera. Incidentally, an "impact detection method" employed in this step will be described later.

If no impacts are detected in step S62, the main routine exits therefrom through the "NO"-branch to step S80 whereupon the camera is set in such a way as to be ready for taking a picture. If the signal level of an output signal of the shock IC is the "L"-level in step S81, it is judged (in step S81) that an impact is made on the camera. Further, information representing such a fact is stored in the EEPROM 112 in step S82. Thereafter, the camera is collapsed (in step S83).

In contrast, if no impacts are detected in step S81, it is judged (in step S84) whether or not there is any camera operation which the user desires. If so, the normal operations of the camera, namely, the zoom driving operation, the lens driving operation, for instance, the focusing operation or the film feeding operation, and the picture-taking operation and the printing operation are performed according to information representing the camera operation which the user desires (in step S85).

Incidentally, in step S81, when the main switch is on, the CPU waits for the detection of an impact.

Further, the detection of an impact, which is performed in step S62, is to check the contents of information stored in the EEPROM 112. In step S81, if an impact signal is detected, the information concerning the impact is read from the EEPROM 112. If the fact of the detection of the impact is verified, the main routine advances to step S63 whereupon it is checked whether or not a failure due to the impact occurs. Here, objects to be checked are limited to the lens-barrel, the picture-taking lens and the clutch mechanism, which are most vulnerable to impacts. Further, these objects are checked by performing the following procedures.

A first object, namely, the lens-barrel is checked in steps S63 to S66. Namely, simultaneously with the drawing-out/drawing-in of the lens-barrel, the driving speed in the case of the lens-barrel driving operation at that time is measured by using the signals outputted from the zoom PI 118 (in step S63). A method for this measurement is the same as the method performed by executing the aforementioned subroutine of FIG. 24 for the "driving speed detection". Briefly, if an excessive stress is imposed on the lens-barrel 143 of FIG. 21 owing to the impact and at least one of the gears of the gear trains 142 and 145 is damaged, the internally toothed disk 146 does not smoothly rotate. As a result, the signal outputted from the zoom PI 118 has the abnormal waveform as illustrated in FIG. 23.

Further, data representing the time period between adjacent edges of pulses of the signal outputted by the zoom PI 118, which has been stored in the EEPROM 112, is read therefrom (in step S64). This data representing the time period, which has been measured during the normal operation of the camera before the impact is made thereon, has been held and stored therein.

Then, this speed at the time of the normal operation is compared with the aforementioned driving speed posterior to the detection of the impact (in step S65). Namely, the comparison between the waveforms of FIGS. 22 and 23 is made. The time period between the leading edge e1 and the subsequent trailing edge e2 in the waveform of the signal outputted from the zoom PI of FIG. 23 is long in comparison with the case of the waveform of FIG. 22. In the case that the waveform posterior to the detection of the impact is considerably different from the waveform in the case of the normal operation, it is judged that an "abnormality" occurs. Consequently, the abnormal termination of the main routine is performed.

In contrast, if no substantial difference is obtained as a result of this comparison, it is judged (in step S66) that the impact does not cause a failure of the "lens-barrel" of this camera and that "no abnormality" occurs. The procedure described hereinabove is what is called a "failure checking process" concerning the lens-barrel driving.

Next, a second object, namely, the lens is checked in steps S67 to S70. Namely, the failure checking process upon drawing out the lens is conducted by performing the following procedure.

First, simultaneously with the drawing-out/drawing-in of the lens, the driving speed in the case of the lens driving operation at that time, namely, the speed posterior to the detection of the impact is measured (in step S67).

Next, data representing the lens driving speed, which has been measured during the normal operation of the camera, is read from the EEPROM 112 (in step S68).

Subsequently, the speed in the case of the normal operation is compared with the aforementioned driving speed posterior to the detection of the impact (in step S69). In the case that the speed posterior to the detection of the impact is extraordinarily or extremely different from the speed in the case of the normal operation, an "abnormality" is regarded as having occurred. Thus, the abnormal termination of the main routine is performed.

In contrast, if no substantial difference is obtained as a result of this comparison, it is judged (in step S70) that the impact does not cause a failure of the "lens" of this camera and that "no abnormality" occurs. The procedure described hereinabove is the failure checking process concerning the driving of the mechanism including the lens. Further, the main routine advances to the subsequent "failure checking process" for the clutch mechanism 150.

Namely, a third object, which is the clutch mechanism, is checked in steps S71 to S74. Similarly as in the aforementioned cases, in this clutch-mechanism failure checking process, first, the driving speed of the clutch mechanism posterior to the generation of the impact is measured by causing the clutch mechanism to operate (in step S71).

Then, data representing the normal operating speed in the case of the normal operation, which has been stored and held in the EEPROM 112, is read therefrom (in step S72).

Subsequently, the read speed in the case of the normal operation is compared with the aforementioned speed data posterior to the generation of the impact (in step S73). In the case that the speed posterior to the detection of the impact is extraordinarily or extremely different from the speed in the case of the normal operation, it is judged (in step S74) that an "abnormality" occurs. Thus, the abnormal termination of the main routine is performed.

In contrast, if the speed posterior to the generation of the impact is substantially equal to the normal speed data, it is judged (in step S74) that the impact does not cause a failure of the clutch mechanism and that "no abnormality" occurs. Thus, the main routine advances to step 80. The procedure described hereinabove is the failure checking process concerning the clutch mechanism.

If it is judged from the results of a sequence of the failure checking processes concerning the three objects that "no abnormalities" occur, this camera can be used without being repaired. Thus, the user can take a picture without worrying about the camera. In contrast, in the case where it is judged that an "abnormality" occurs, if the camera is used without being repaired, there is the fear that the taken picture is out of focus and that the fault of the camera itself occurs. Therefore, occurrences of such cases may be prevented by prohibiting the acceptance of an operation of handling the entire camera or of handling the release switch so as not to take a failure picture as above described. Moreover, there can be taken preventive measures, for example, the notification of the possibility of a failure of the camera to a user by use of the predetermined display means or the sounding means thereof.

Next, the operation and advantages of the sixth embodiment of the present invention will be described hereinbelow. When an impact made on the lens-barrel, the lens or the clutch mechanism of the camera is detected by the shock sensors 121, 123 or 125, an output signal of the shock sensor is amplified by the shock IC and the amplified signal is supplied to the CPU 111. If it is detected that an impact having a level, which is not less than a predetermined level, is made on, for example, the lens-barrel or the lens, the CPU causes the IF-IC 113 to drive the zoom motor 115 or the lens motor 116 so as to perform the predetermined mechanism initialization operations such as the drawing-out/drawing-in of the lens-barrel or the lens. Further, the "driving speed" corresponding to the driving operation is measured by using the zoom PI 118 or the lens PI. Similarly, the predetermined operation is performed on the clutch mechanism. Furthermore, the driving condition of the clutch mechanism is measured by using the clutch PI.

On the other hand, information concerning the "movement speed" in the case of the normal operation of the lens-barrel, the lens and the clutch mechanism is preliminarily stored in the EEPROM 112 as normal data. Thus, the value of the normal speed stored in this EEPROM is compared with the speed of each part of the camera posterior to the generation of an impact, which is detected during the mechanism initialization operation, by the CPU. If an abnormal driving condition is detected in at least one of the lens-barrel, the lens and the clutch mechanism, the CPU performs control operations so that each part of the camera is on a safe side.

Thus, occurrences of malfunction of a camera and troubles therein, which are caused by the destruction of major components thereof resulting from an impact made thereon, can be prevented by conducting suitable judgments on the driving conditions and performing appropriate operation control during checks made mainly on important parts, which are vulnerable to impacts, so as to minimize inconvenience due to an abnormality in a principal part of the camera.

In the case of the fifth and sixth embodiments, the impact detection means corresponds to the shock sensor and the shock IC. Further, the storage means may correspond to the EEPROM. Alternatively, the memory provided in the CPU may be used as the storage means. Moreover, this CPU may be used as the control means for controlling the main body of the camera in a supervising manner. Furthermore, the driving-condition detection means and the comparison means may be implemented in the CPU by utilizing software by executing the illustrated processing routines.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. In combination, an apparatus having parts to be monitored for a possible abnormality and a failure detection and storage device which is a single, portable unit for detecting an abnormality experienced by said apparatus, said device comprising:

failure factor detection means for detecting a failure factor capable of causing a failure of said apparatus experienced by said apparatus;

date-and-time information output means for outputting date-and-time information which corresponds to a date and a time at which a failure factor experienced by said apparatus is detected by said failure factor detection means;

abnormality detection means for detecting whether the apparatus has experienced an abnormality, including identifying means for identifying a part in the apparatus which has experienced an abnormality, responsive to detection of a failure factor by said failure factor detection means;

storage means for storing failure factor information detected by said failure factor detection means, date-and-time information outputted by the date-and-time information output means and information representing the part identified as abnormal by said identifying means;

display means for displaying the information stored by the storage means;

failure factor level determining means for determining a level of a failure factor detected by said failure factor detection means; and control means for deciding whether or not at least one of the failure factor information detected by the failure factor detection means, the date-and-time information, which is outputted by the date-and-time information output means and information representing the part identified as abnormal by said identifying means, is stored by the storage means.

2. The failure detection and storage device according to claim 1, wherein the failure factor is at least one of an impact, a temperature and a humidity.

3. A camera being capable of detecting an abnormality, comprising:

damage detection means for detecting when a failure factor condition external to said camera is applied to the camera;

abnormality detection means for initiating an operation for detecting a presence of an abnormality by judging a state of the camera responsive to the output signal generated by the damage detection means and for generating abnormality information;

storage means for storing abnormality information corresponding to the abnormality detected by the abnormality detection means; and display means for displaying the information stored in the storage means.

4. The camera according to claim 3 wherein the abnormality information stored in the storage means represents a part thereof, at which the abnormality occurs.

5. The camera according to claim 3, wherein the damage is a condition which can cause a failure thereof and includes at least one of an impact, a temperature and a humidity.

6. A camera for detecting an abnormality, comprising:
   failure factor detection means for detecting a failure factor being capable of causing a failure thereof and for outputting detection information of representing different levels of failure factor;
   date-and-time information output means for obtaining a date and a time at which the failure factor is generated by said failure factor determining means, and for outputting date-and-time information;
   storage means for storing information including a failure factor level detected by the detection means and for storing the date-and-time information outputted by the date-and-time information output means; and
   display means for reading and displaying the information stored in the storage means.

7. A camera being capable of detecting an abnormality, comprising:
   damage detection means for detecting a possible damage caused to a camera and for generating an output signal;
   abnormality detection means for detecting an abnormality by judging a state of a the camera according to the output signal generated by the damage detection means;
   date-and-time information output means for outputting date-and-time information;
   storage means adapted so that, when an abnormality is detected by the abnormality detection means, the storage means stores information including the date-and-time information, which is outputted by the date-and-time information, and abnormal part information representing a part of the camera, at which the abnormality is detected by the abnormality detection means; and
   display means for displaying the information stored in the storage means.

8. A device which is a single, portable unit capable of detecting an abnormality, said device comprising:
   detection means for detecting a cause of a possible failure, which is one of an impact and a change in temperature, and for outputting detection information corresponding to the cause;
   timing means for determining one of a date and a time;
   storage means for storing information representing a result of determination of the date and time;
   display means for displaying information stored in the storage means;
   a cause of failure's level determining means for determining a level represented by the detection information outputted by the information detection means; and
   control means for deciding whether or not the information representing the result of determination and of one of the date and time is stored in the storage means based on the output of the cause of failure's level determining means.

9. A failure detection and storage device formed as a single, portable unit, said device comprising:
   failure factor detection means for detecting application of a failure factor condition to an apparatus, capable of causing a failure;
   date-and-time information output means for outputting date-and-time information which corresponds to a date and a time at which the failure factor condition is detected;
   storage means for storing date-and-time information outputted by the date-and-time information output means and information identifying an abnormal part of said apparatus detected by said detection means;
   display means for displaying the information stored by the storage means;
   failure factor level determining means for determining a level of the failure factor detected by failure factor detection means; and
   control means for deciding whether or not the date-and-time information, which is outputted by the date-and-time means, and the abnormal part information of said apparatus which is detected by said abnormality detection means is stored by the storage means based on the output of the failure factor level determining means.

10. A camera being capable of detecting an abnormality, comprising:
    damage detection means for detecting a possible damage caused to a camera and for generating an output signal;
    abnormality detection means for detecting an abnormality by judging a state of the camera according to the output signal generated by damage detection means;
    date-and-time information output means for outputting date-and-time information;
    storage means responsive to an abnormality detected by the abnormality detection means for storing date-and-time information outputted by the date-and-time information output means; and
    display means for displaying the information stored in the storage means.

11. A device, which is a single portable unit, capable of detecting an abnormality, comprising:
    detection means for detecting a cause of a possible failure, which is one of an impact and a change in temperature, and for outputting detection information corresponding to a cause of the abnormality;
    timing means for determining one of a date and a time;
    storage means for storing information representing a result of determination of the date and time;
    display means for displaying information stored in the storage means; and
    control means for deciding whether or not the information representing the result of determination of one of the date and time by said timing means is stored in the storage means based on a result outputted by said detection means.

* * * * *